United States Patent
Lachman et al.

(10) Patent No.: US 10,327,549 B2
(45) Date of Patent: *Jun. 25, 2019

(54) DRAWER GLIDE MECHANISM

(71) Applicant: RSI HOME PRODUCTS MANAGEMENT, INC., Anaheim, CA (US)

(72) Inventors: Edward William Roy Lachman, Corona Del Mar, CA (US); Bradly Anderson, Pomona, CA (US)

(73) Assignee: RSI HOME PRODUCTS MANAGEMENT, INC., Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/697,278

(22) Filed: Sep. 6, 2017

(65) Prior Publication Data

US 2018/0206635 A1 Jul. 26, 2018

Related U.S. Application Data

(60) Division of application No. 15/188,821, filed on Jun. 21, 2016, now Pat. No. 9,756,942, which is a (Continued)

(51) Int. Cl.
*A47B 88/40* (2017.01)
*A47B 88/43* (2017.01)
(Continued)

(52) U.S. Cl.
CPC .......... *A47B 88/487* (2017.01); *A47B 88/423* (2017.01); *A47B 88/43* (2017.01); (Continued)

(58) Field of Classification Search
CPC ..... A47B 88/487; A47B 88/437; A47B 88/49; A47B 88/493; A47B 88/427; A47B 88/43; A47B 2210/0059
See application file for complete search history.

(56) References Cited

U.S. PATENT DOCUMENTS

| 1,343,513 A | 6/1920 | Lenhart |
| 1,910,208 A | 5/1933 | Gronberg et al. |

(Continued)

FOREIGN PATENT DOCUMENTS

DE 20116057 U1 12/2001

*Primary Examiner* — Daniel J Rohrhoff
(74) *Attorney, Agent, or Firm* — Knobbe, Martens, Olson & Bear, LLP

(57) ABSTRACT

A drawer glide mechanism can include a first elongate guide member, a second elongate guide member, a ball bearing component, a v-notch socket, a release mechanism, and/or a roller support. The first elongate guide member can include a distal end that is configured to fit within an opening in the v-notch socket. The drawer glide mechanism can further include one or more floating members and fixed members. In some cases, the drawer glide mechanism includes a release member configured to facilitate separation of the first and second elongate guide members when actuated and to inhibit or prevent accidental separation of the first and second elongate guide members.

19 Claims, 26 Drawing Sheets

Related U.S. Application Data continuation of application No. 14/706,829, filed on May 7, 2015, now Pat. No. 9,375,084.

(60) Provisional application No. 61/991,263, filed on May 9, 2014.

(51) Int. Cl.
| | |
|---|---|
| *F16C 43/04* | (2006.01) |
| *A47B 88/423* | (2017.01) |
| *A47B 88/487* | (2017.01) |

(52) U.S. Cl.
CPC .............. *F16C 43/04* (2013.01); *A47B 88/40* (2017.01); *A47B 2088/4235* (2017.01); *A47B 2210/0018* (2013.01); *A47B 2210/0032* (2013.01); *A47B 2210/0059* (2013.01); *F16C 2314/72* (2013.01)

(56) References Cited

U.S. PATENT DOCUMENTS

| | | | |
|---|---|---|---|
| 2,336,153 A | 12/1943 | Ryder | |
| 2,551,843 A | 5/1951 | Knuth et al. | |
| 2,692,802 A | 10/1954 | Kurtzon et al. | |
| 2,711,358 A | 6/1955 | Gussack | |
| 2,843,444 A | 7/1958 | Nelson et al. | |
| 2,859,070 A | 11/1958 | Gomersall | |
| 2,956,605 A | 10/1960 | Rapata | |
| 2,981,584 A | 4/1961 | Friend | |
| 2,985,491 A | 5/1961 | Hayes et al. | |
| 2,992,057 A | 7/1961 | Maxwell et al. | |
| 3,031,249 A | 4/1962 | Koch | |
| 3,099,501 A | 7/1963 | Hilson et al. | |
| 3,418,869 A | 12/1968 | Herpich | |
| 3,451,734 A | 6/1969 | Laure | |
| 3,469,892 A | 9/1969 | Langstroth | |
| 3,829,191 A | 8/1974 | Jenkins | |
| 3,869,958 A | 3/1975 | Murayama | |
| 3,874,748 A | 4/1975 | Figueroa | |
| 4,113,328 A | 9/1978 | Vander Meulen | |
| 4,181,383 A | 1/1980 | Naef | |
| 4,240,323 A | 12/1980 | Kojima | |
| 4,263,833 A | 4/1981 | Loudin | |
| 4,278,309 A | 7/1981 | Dreiling | |
| 4,288,137 A * | 9/1981 | MacDonald | A47B 88/487 312/334.45 |
| 4,295,688 A | 10/1981 | Blasnik | |
| 4,311,421 A | 1/1982 | Okada | |
| 4,362,346 A | 12/1982 | Emmert | |
| 4,579,492 A | 4/1986 | Kazino | |
| 4,581,799 A | 4/1986 | Bessinger | |
| 4,601,522 A | 7/1986 | Röck | |
| 4,610,587 A | 9/1986 | Wollar | |
| 4,737,039 A | 4/1988 | Sekerich | |
| 4,842,422 A | 6/1989 | Nelson | |
| 4,878,791 A | 11/1989 | Kurihara | |
| 4,881,826 A | 11/1989 | Grass | |
| 4,909,558 A | 3/1990 | Roshinsky | |
| 4,919,548 A | 4/1990 | Lautenschlager | |
| 4,979,262 A | 12/1990 | Lautenschlager | |
| 5,039,181 A | 8/1991 | Lautenschlager | |
| 5,257,861 A | 11/1993 | Domenig et al. | |
| 5,302,030 A | 4/1994 | Buie et al. | |
| 5,310,255 A | 5/1994 | Ranallo | |
| 5,345,959 A | 9/1994 | Matteson | |
| 5,387,033 A * | 2/1995 | Domenig | A47B 88/43 248/201 |
| 5,439,283 A | 8/1995 | Schröder et al. | |
| 5,457,807 A | 10/1995 | Weinblatt | |
| 5,457,867 A * | 10/1995 | Maberry | A47B 88/43 29/525 |
| 5,466,060 A | 11/1995 | Hoffman | |
| 5,490,724 A | 2/1996 | Domenig | |
| 5,549,376 A | 8/1996 | Domenig | |
| 5,562,333 A | 10/1996 | Domenig et al. | |
| 5,564,807 A | 10/1996 | Rock et al. | |
| 5,597,220 A | 1/1997 | Domenig et al. | |
| 5,636,820 A | 6/1997 | Domenig | |
| 5,636,891 A | 6/1997 | Van Order | |
| 5,641,216 A | 6/1997 | Grass | |
| 5,695,265 A | 12/1997 | Hoffman | |
| 5,733,026 A | 3/1998 | Munachen | |
| 5,746,490 A | 5/1998 | Domenig | |
| 5,806,949 A | 9/1998 | Johnson | |
| 5,823,648 A | 10/1998 | Domenig | |
| 5,895,101 A | 4/1999 | Cabrales et al. | |
| 6,010,200 A | 1/2000 | Hays | |
| 6,076,908 A | 6/2000 | Maffeo | |
| 6,302,502 B1 | 10/2001 | Larsen, Jr. | |
| 6,325,473 B1 | 12/2001 | Brustle et al. | |
| 6,367,900 B1 | 4/2002 | Woerner | |
| 6,386,661 B1 | 5/2002 | Woerner | |
| 6,402,276 B1 | 6/2002 | King | |
| 6,478,393 B2 | 11/2002 | Kim et al. | |
| 6,494,550 B1 | 12/2002 | Chen et al. | |
| 6,494,551 B1 | 12/2002 | Markley | |
| 6,557,960 B2 | 5/2003 | Shih | |
| 6,565,168 B1 | 5/2003 | Baliko | |
| 6,585,336 B2 | 7/2003 | Munday et al. | |
| 6,619,771 B2 | 9/2003 | Kueng et al. | |
| 6,619,772 B2 | 9/2003 | Dierbeck | |
| 6,733,098 B1 | 5/2004 | Branson | |
| 6,757,937 B2 | 7/2004 | Salice | |
| 6,788,997 B1 | 9/2004 | Frederick | |
| 6,854,816 B2 | 2/2005 | Milligan | |
| 6,854,817 B1 | 2/2005 | Simon | |
| 6,923,518 B2 | 8/2005 | Kim | |
| 6,945,618 B2 | 9/2005 | Kim et al. | |
| 6,988,626 B2 | 1/2006 | Varghese et al. | |
| 7,090,320 B2 | 8/2006 | Chen et al. | |
| 7,108,143 B1 | 9/2006 | Lin | |
| 7,331,644 B2 | 2/2008 | Lowe | |
| 7,331,664 B2 | 2/2008 | Lowe | |
| 7,883,162 B2 | 2/2011 | Langguth et al. | |
| 7,993,084 B2 | 8/2011 | Hitchcock | |
| 8,002,470 B2 | 8/2011 | Cheng | |
| 8,052,234 B2 | 11/2011 | Liang et al. | |
| 8,231,189 B2 | 7/2012 | Liang et al. | |
| 8,876,232 B2 | 11/2014 | Anderson et al. | |
| 9,211,008 B2 | 12/2015 | Chen | |
| 9,375,084 B2 * | 6/2016 | Lachman | A47B 88/423 |
| 9,398,808 B2 | 7/2016 | Anderson et al. | |
| 9,538,844 B2 | 1/2017 | Chen | |
| 2001/0054863 A1 * | 12/2001 | Uchino | A47B 88/487 312/334.12 |
| 2002/0074915 A1 | 6/2002 | Shih | |
| 2002/0089272 A1 | 7/2002 | Liang | |
| 2002/0180321 A1 | 12/2002 | Chen et al. | |
| 2003/0071548 A1 | 4/2003 | Milligan | |
| 2003/0107308 A1 | 6/2003 | Kueng et al. | |
| 2003/0111942 A1 | 6/2003 | Judge et al. | |
| 2004/0104651 A1 | 6/2004 | Kreft et al. | |
| 2004/0145285 A1 | 7/2004 | Hwang | |
| 2004/0145286 A1 | 7/2004 | Kim | |
| 2004/0227441 A1 | 11/2004 | Want et al. | |
| 2004/0227442 A1 * | 11/2004 | Huang | A47B 88/487 312/334.9 |
| 2004/0256333 A1 | 12/2004 | Buhlmeyer et al. | |
| 2005/0218762 A1 | 10/2005 | Lammens | |
| 2005/0225219 A1 | 10/2005 | Chen et al. | |
| 2005/0264146 A1 | 12/2005 | Fitz | |
| 2006/0226748 A1 | 10/2006 | Kinsel et al. | |
| 2008/0018213 A1 | 1/2008 | Chen et al. | |
| 2008/0224583 A1 | 9/2008 | Prenter | |
| 2008/0284299 A1 | 11/2008 | Chen | |
| 2009/0174299 A1 | 7/2009 | Lam et al. | |
| 2009/0195133 A1 | 8/2009 | Chang | |
| 2011/0234072 A1 | 9/2011 | Hightower | |
| 2012/0013235 A1 | 1/2012 | Hisamatsu | |
| 2012/0049712 A1 | 3/2012 | Lebbezoo | |
| 2012/0145845 A1 | 6/2012 | Hightower | |
| 2013/0106271 A1 | 5/2013 | Anderson et al. | |
| 2013/0193824 A1 | 8/2013 | Koenig | |

(56) References Cited

U.S. PATENT DOCUMENTS

| | | |
|---|---|---|
| 2013/0334766 A1 | 12/2013 | Okamoto |
| 2013/0334949 A1* | 12/2013 | Yokoyama ............... B65H 1/00 |
| | | 312/334.12 |
| 2014/0044382 A1 | 2/2014 | Chen |
| 2014/0079346 A1 | 3/2014 | Chung |
| 2014/0191645 A1* | 7/2014 | Kuba ................. A47B 88/0466 |
| | | 312/334.12 |
| 2014/0265795 A1* | 9/2014 | Muller ................... A47B 88/04 |
| | | 312/334.46 |
| 2015/0275963 A1 | 10/2015 | Petersson |
| 2015/0342346 A1 | 12/2015 | Lachman et al. |
| 2017/0099947 A1 | 4/2017 | Lachman et al. |

\* cited by examiner

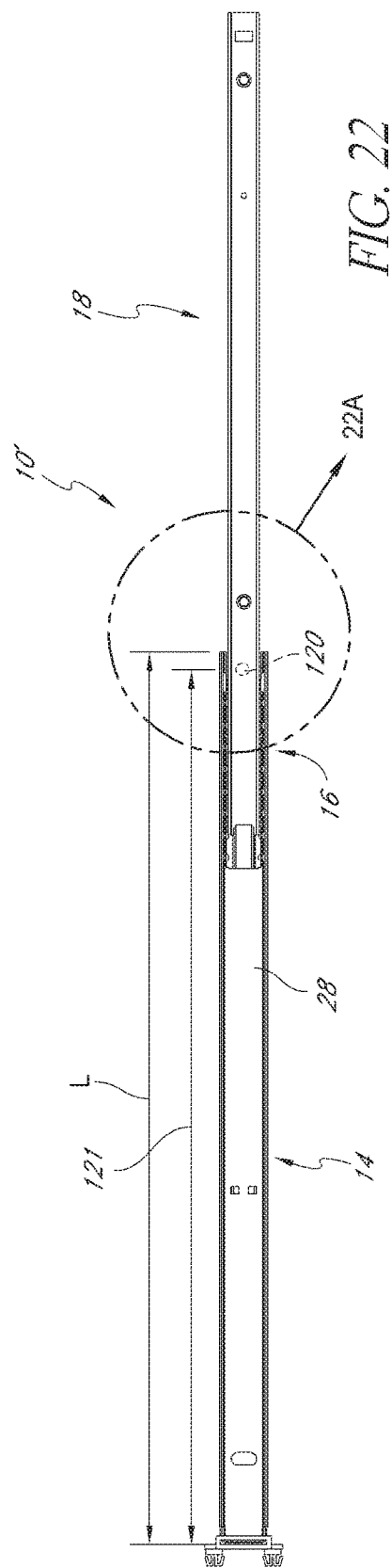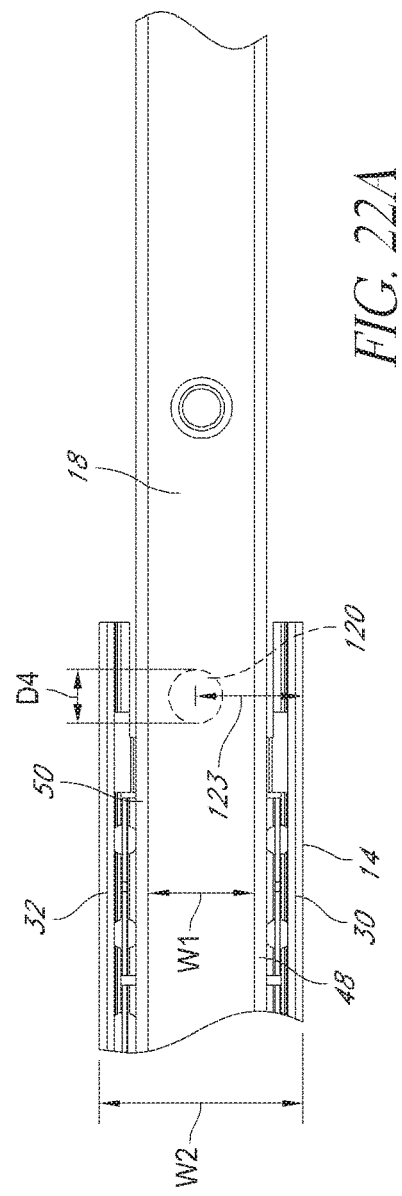

DRAWER GLIDE MECHANISM

CROSS-REFERENCE TO RELATED APPLICATIONS

This application is a divisional of U.S. patent app. Ser. No. 15/188,821, filed Jun. 21, 2016, which is a continuation of U.S. patent app. Ser. No. 14/706,829, filed May 7, 2015, which claims benefit under 35 U.S.C. § 119(e) to U.S. Provisional Patent Application No. 61/991,263, filed May 9, 2014, which is incorporated in its entirety by reference herein. Any and all priority claims identified in the Application Data Sheet, or any correction thereto, are hereby incorporated by reference under 37 CFR 1.57.

BACKGROUND OF THE INVENTIONS

Field of the Inventions

The present application relates generally to drawer glide mechanisms.

Description of the Related Art

Drawer glide mechanisms are commonly used to facilitate the opening and closing of drawers. Drawer glide mechanisms generally include a plurality of elongate guide members that slide relative to one another. The elongate guide members are often metal or plastic pieces mounted, for example, to the sides of drawers, and/or within a storage device (e.g. cabinetry).

Some common drawer glide mechanisms are referred to as epoxy glides. These types of drawer glide mechanisms are low cost, and include a single roller (e.g. wheel) on both ends of the glide mechanism. The rollers are used to allow a drawer to slide in and out of a piece of cabinetry along the guide members. The epoxy glides can be mounted to the back of a cabinetry, for example, using a single piece v-notch socket. The v-notch socket, which is generally a single plastic piece mounted to the back of a cabinetry, can receive one end of a guide member to help hold the guide member in place.

Other types of drawer glide mechanisms incorporate ball bearing guide members that allow a drawer to slide in and out in a more smooth manner. These drawer glide mechanisms often require an expensive, larger, thicker, and/or heavier two-piece socket with multiple screws or other fasteners to fasten the two-piece socket in place to the back of a storage unit. These drawer glide mechanisms are used for example in industrial settings and for high-end cabinetry where there are tight dimensional tolerances.

SUMMARY OF THE INVENTION

An aspect of at least one of the embodiments disclosed herein includes the realization that epoxy glides can often create rough, uneven drawer movement within a piece of cabinetry, due to the single rollers, loose fit of the guides, and the size/weight of a cabinet drawer.

Another aspect of at least one of the embodiments disclosed herein includes the realization that due to the high cost and labor involved with the two-piece socket and ball bearing guide, and the lack of tight tolerances often found in kitchen and bathroom cabinetry, a typical ball bearing drawer glide mechanism is not ideal for use in mass production of kitchen/bathroom cabinetry.

Therefore, it would be advantageous to have a drawer glide mechanism for kitchens/bathroom cabinetry that utilizes the advantage of ball bearing guides for smooth operation of the drawer, and also utilizes the advantage of a v-notch type socket for cost-efficiency.

Thus, in accordance with at least one embodiment described herein, a drawer glide mechanism can comprise a first elongate guide member having a distal end, a second elongate guide member nested within the first elongate guide member, a ball bearing component comprising a plurality of ball bearings between the first and second elongate guide members configured to permit movement of the second elongate guide member relative the first elongate guide member, and a v-notch socket having at least a first opening for receiving the distal end of the first elongate guide member.

Another aspect of at least one of the embodiments disclosed herein includes the realization that wood and/or other types of drawers often are warped or are otherwise misshapen and uneven. When installing a warped drawer into a cabinet, it can be difficult to properly align and install the drawer, particularly when the drawer is intended to be attached directly to one or more drawer glides.

Therefore, it would be advantageous to have a drawer glide mechanism for kitchens/bathroom cabinetry that utilizes an attachment structure that compensates for warping of drawers, and facilitates easy attachment and adjustment of the drawer within the cabinetry.

Thus, in accordance with at least one embodiment disclosed herein, a drawer glide mechanism can comprise a first elongate guide member having a distal end, a second elongate guide member nested within the first elongate guide member, the second elongate guide member having a longitudinally extending body, a fixed member protruding from and extending generally transverse to the longitudinally extending body, and a floating member extending at least partially over the fixed member, the floating member configured to slide over the first fixed member in a transverse direction relative the longitudinally extending body.

In accordance with at least another embodiment disclosed herein, a drawer system can comprise a drawer cabinet comprising a back side panel, two side panels, and a plurality of face frame components, two drawer glide mechanisms, each of the drawer glide mechanisms attached to the back side panel and comprising a first elongate guide member having a longitudinally extending body and a distal end, a second elongate guide member nested within the first elongate guide member, the second elongate guide member having a longitudinally extending body, at least one fixed member protruding from and extending generally transverse to the longitudinally extending body of the second elongate guide member, at least one floating member extending at least partially over the fixed member, the floating member configured to slide over the first fixed member in a transverse direction relative the longitudinally extending body of the second elongate guide member, a ball bearing component comprising a plurality of ball bearings between the first and second elongate guide members configured to permit longitudinal movement of the second elongate guide member relative to the first elongate guide member, a socket having a body portion, at least a first opening in the body portion, and at least one dowel portion protruding from a back side of the body portion and into the back side panel of the drawer cabinet, the socket configured to receive the distal end of the first elongate guide member, and a drawer comprising a back drawer panel, two side drawer panels, and a front drawer panel, the drawer attached to the second elongate guide member via the at least one floating member.

According to some variants, a drawer system can include a drawer cabinet having a back wall. The drawer system can include a drawer having a first sidewall. In some cases, the drawer system includes a drawer glide mechanism. The drawer glide mechanism can have a first elongate guide member connected to the back wall and having a front end and a back end. In some cases, the drawer glide mechanism includes a second elongate guide member coupled with the first elongate guide member and connected to the first sidewall, the second elongate guide member having a front end and a back end. In some embodiments, the drawer glide mechanism includes a ball bearing component. The ball bearing component can be nested between the first elongate guide member and the second elongate guide member. In some cases, the drawer glide mechanism includes a roller support coupled with the first elongate guide member. The roller support can be coupled to the first elongate guide member adjacent the front end of the first elongate guide member. In some embodiments, the second elongate guide member is configured to transition between a first state and a second state. In some cases, the front end of the second elongate member is positioned lower in the second state than in the first state. In some embodiments, the second elongate member does not contact the roller support when the second elongate member is in the first state.

In some embodiments, the second elongate guide member is configured to engage the roller support when the front end of the second elongate member moves a predetermined distance downward from the first state. In some cases, the second elongate guide member is configured to engage the roller support when a greater downward load is applied to a front portion of the drawer than to a back portion of the drawer. In some embodiments, the drawer is configured to transition between a fully retracted position and a fully extended position. In some cases, the second elongate guide member is configured to engage with the roller support when the drawer is in the fully extended position. In some embodiments, the roller support is positioned between the ball bearing component and the proximal end of the first elongate guide member. In some cases, the second elongate guide member includes an upper flange and a lower flange, the roller support is positioned between the upper and lower flanges of the second elongate guide member, and a diameter of the roller support is approximately ⅔ of a distance between the upper and lower flanges of the second elongate guide member. In some embodiments, the second elongate guide member includes an upper flange and a lower flange, the roller support is positioned between the upper and lower flanges of the second elongate guide member, and the roller support includes an axis of rotation, wherein the axis of rotation of the roller support is positioned closer to the upper flange of the second elongate member than to the lower flange of the second elongate member.

According to some variants, a drawer system can include a drawer cabinet having a back side panel. The drawer system can include a drawer having back end, a front end, and a first sidewall. In some embodiments, the drawer system includes a drawer glide mechanism. The drawer glide mechanism can include a first elongate guide member coupled with the back side panel and having a front end and a back end. In some embodiments, the drawer glide mechanism includes a second elongate guide member coupled with the first elongate guide member and with the first sidewall and having a front end and a back end. In some cases, the drawer glide mechanism includes a ball bearing component coupled with the first elongate guide member. In some embodiments, the drawer glide mechanism includes a roller support coupled with the first elongate guide member between the ball bearing component and the front end of the first elongate guide member. In some embodiments, the roller support is sized and shaped to contact the second elongate guide member only when a downward force greater than a force of gravity on the back end of the drawer is applied to the proximal end of the drawer.

In some embodiments, the first elongate member includes a stop configured to interfere with a portion of the second elongate member. In some embodiments, the roller support is positioned between the stop and the front end of the second elongate guide member. In some case, the first elongate member includes a stop configured to prevent movement of the ball bearing component toward the front end of the first elongate guide member past the stop. In some embodiments, the drawer glide mechanism includes a release member connected to the second elongate guide member. The release member can include a first end and a second end. The release member can include an actuation portion between the first end and the second end. In some embodiments, the release member includes an obstruction portion between the first end and the second end. The obstruction portion can be configured to inhibit separation of the second elongate guide member from the first elongate guide member in a proximal direction when the release member is in an obstructing position. In some embodiments, the release member is biased to the obstructing position. The release member can be configured to transition to a releasing position when a force is applied to the actuation portion in a direction toward the second elongate guide member. In some cases, the release member permits separation of the second elongate guide member from the first elongate guide member in the proximal direction when the release member is in the releasing position. In some embodiments, the stop is configured to interfere with the obstruction portion of the release member to prevent movement of the obstruction portion toward the front end of the first elongate guide member past the stop when the release member is in the obstructing position.

According to some variants, a drawer system includes a drawer cabinet having a front and a back. In some cases, the drawer system includes a drawer having a first sidewall. In some embodiments, the drawer system includes a first elongate guide member secured with respect to said first sidewall of said cabinet. The first elongate guide member can have a front end, a back end and a length between the front end and the back end. In some embodiments, the drawer system includes a second elongate guide member nested within the first elongate guide member and connected to the first sidewall of the drawer. In some cases, the drawer system includes a ball bearing race having a front end and a back end. The ball bearing race can include a plurality of ball bearings between the first and second elongate guide members to permit longitudinal movement of the second elongate guide member relative to the first elongate guide member. In some cases, the drawer system includes a roller support attached to the first elongate guide member between the front end of the ball bearing race and the front end of the first elongate guide member.

In some embodiments, the roller support is attached to the first elongate guide member at a distance from the front end of the first elongate guide member between about 75% and about 98% the length of the first elongate guide member. In some embodiments, the drawer system includes a stop extending from the first elongate guide member toward the second elongate guide member. The stop can be configured to inhibit decoupling of the ball bearing component from the first elongate guide member. In some cases, the stop is positioned between and spaced apart from a first flange portion and a second flange portion of the first elongate guide member. In some embodiments, the stop extends from a web portion of the first elongate guide member toward the second elongate guide member. In some embodiments, the stop is positioned between the roller support and the front end of the ball bearing race.

In some embodiments, the drawer system includes a release member connected to the second elongate guide member. The release member can include a first end and a second end. The release member can include an actuation portion between the first end and the second end. In some embodiments, the release member includes an obstruction portion between the first end and the second end. The obstruction portion can be configured to inhibit separation of the second elongate guide member from the first elongate guide member in a forward direction when the release member is in an obstructing position. In some embodiments, the release member is biased to the obstructing position. The release member can be configured to transition to a releasing position when a force is applied to the actuation portion in a direction toward the second elongate guide member. In some embodiments, the release member permits separation of the second elongate guide member from the first elongate guide member in the proximal direction when the release member is in the releasing position.

BRIEF DESCRIPTION OF THE DRAWINGS

These and other features and advantages of the present embodiments will become more apparent upon reading the following detailed description and with reference to the accompanying drawings of the embodiments, in which:

FIG. 22 is a bottom plan view of the drawer glide mechanism of FIG. 21

FIG. 22A is a close up view of the drawer glide mechanism of FIG. 22.

DETAILED DESCRIPTION OF THE PREFERRED EMBODIMENTS

Figure 1:
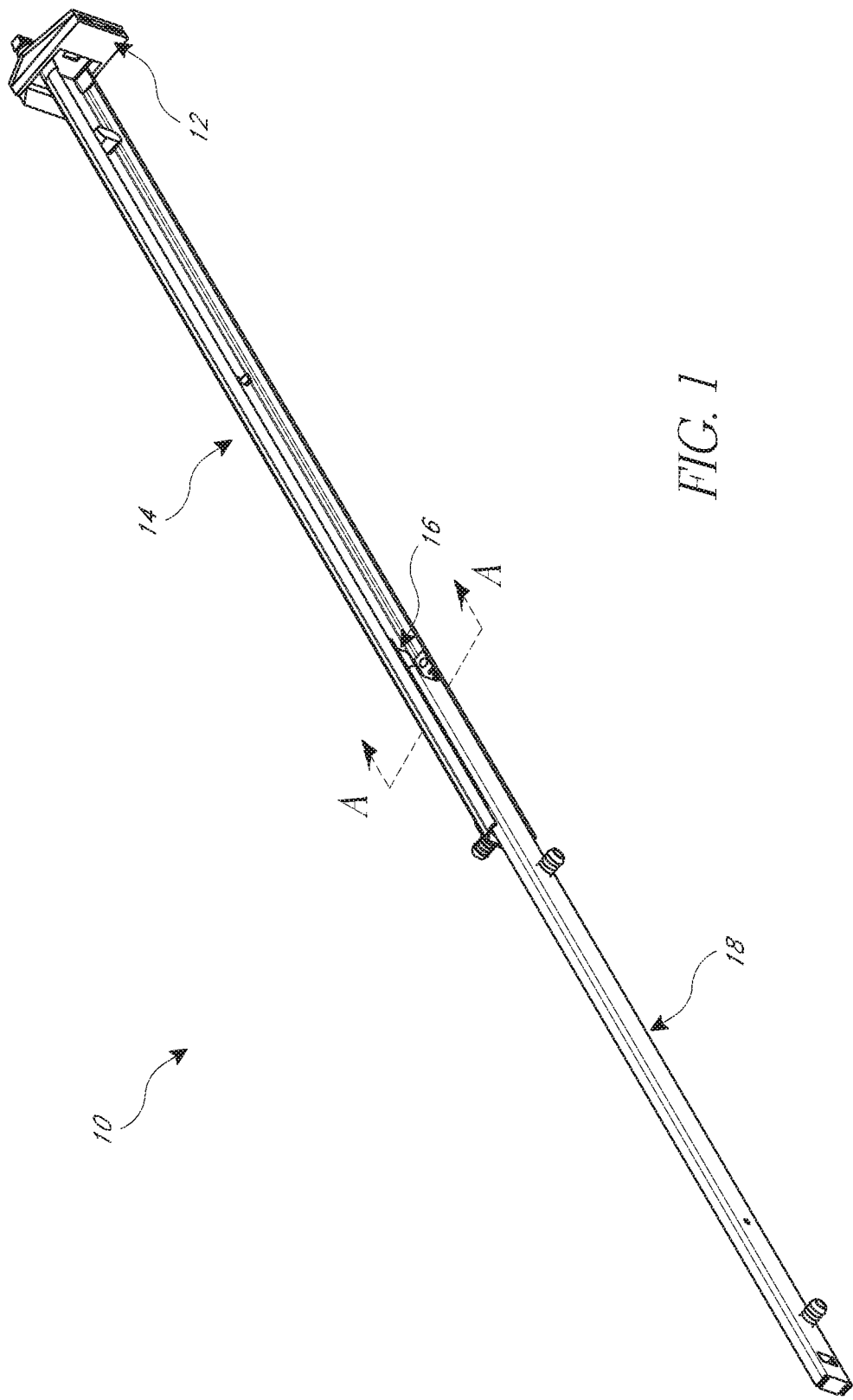
FIG. 1 is a perspective view of an embodiment of a drawer glide mechanism.
Figure 2:
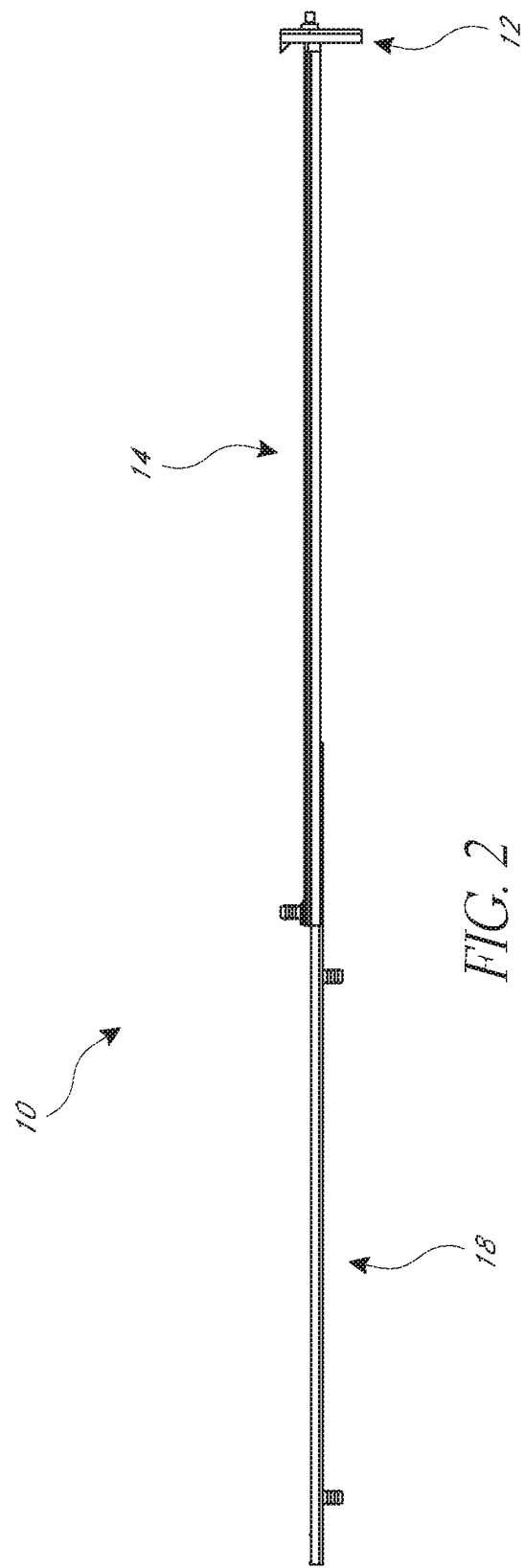
FIG. 2 is a left side elevational view of the drawer glide mechanism of FIG. 1.
Figure 3:
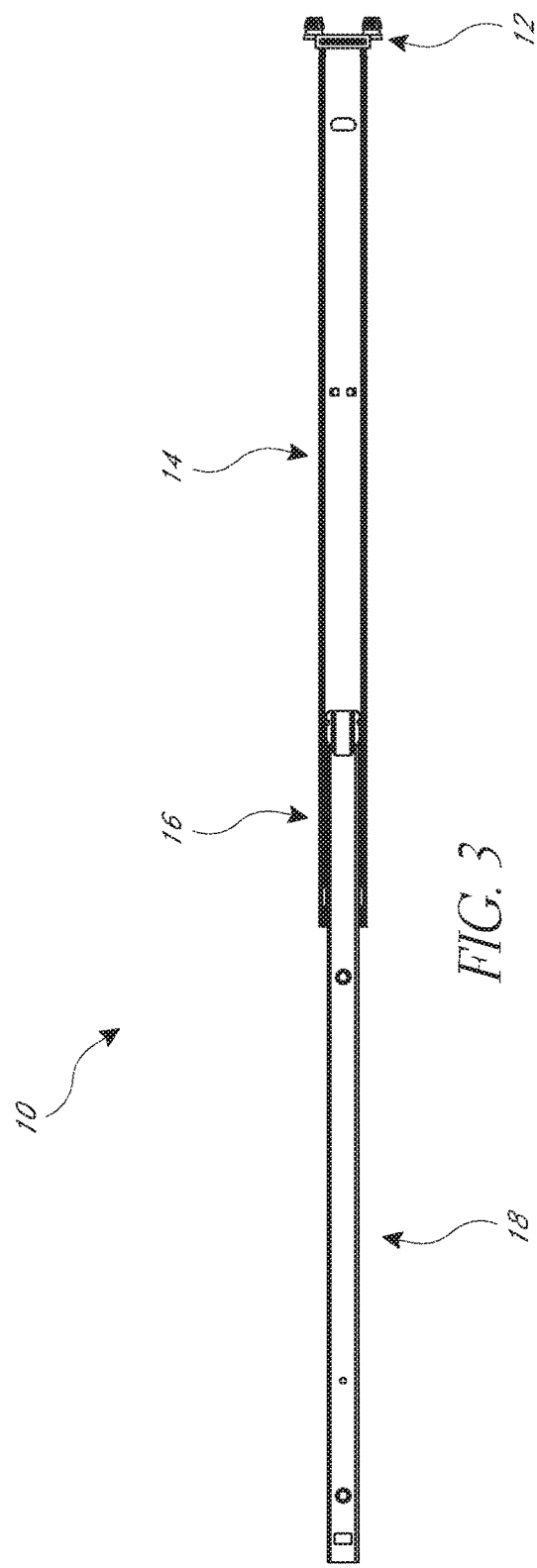
FIG. 3 is a bottom plan view of the drawer glide mechanism of FIG. 1.
Figure 4:
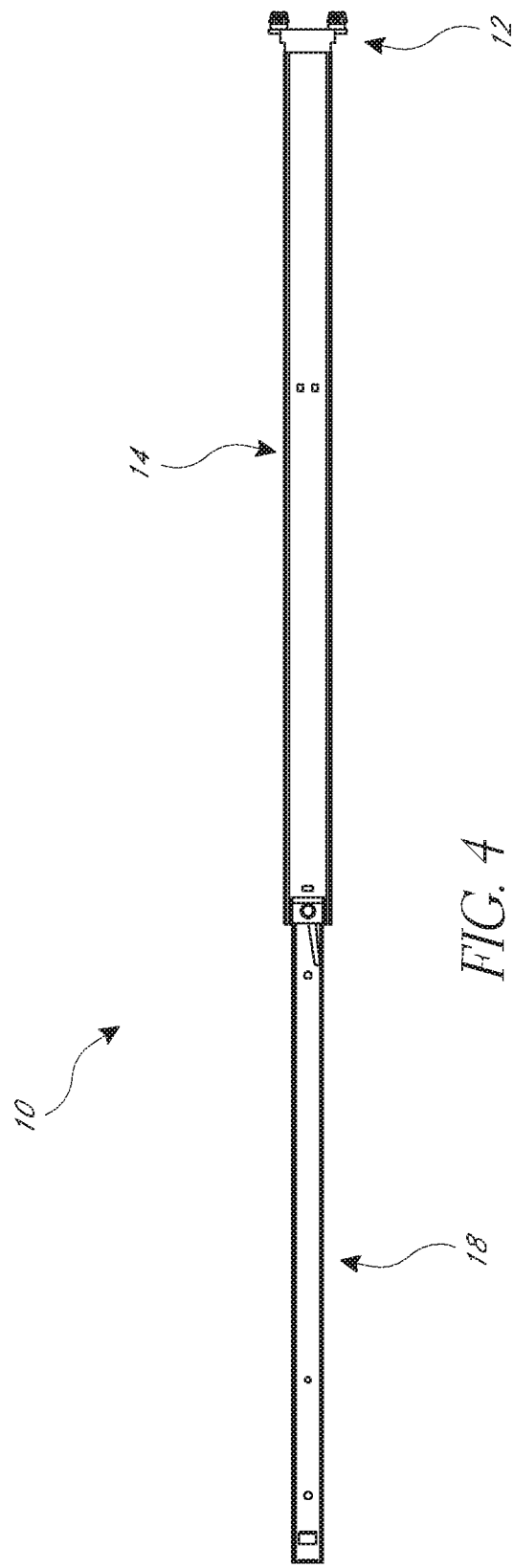
FIG. 4 is a top plan view of the drawer glide mechanism of FIG. 1.
Figure 5:
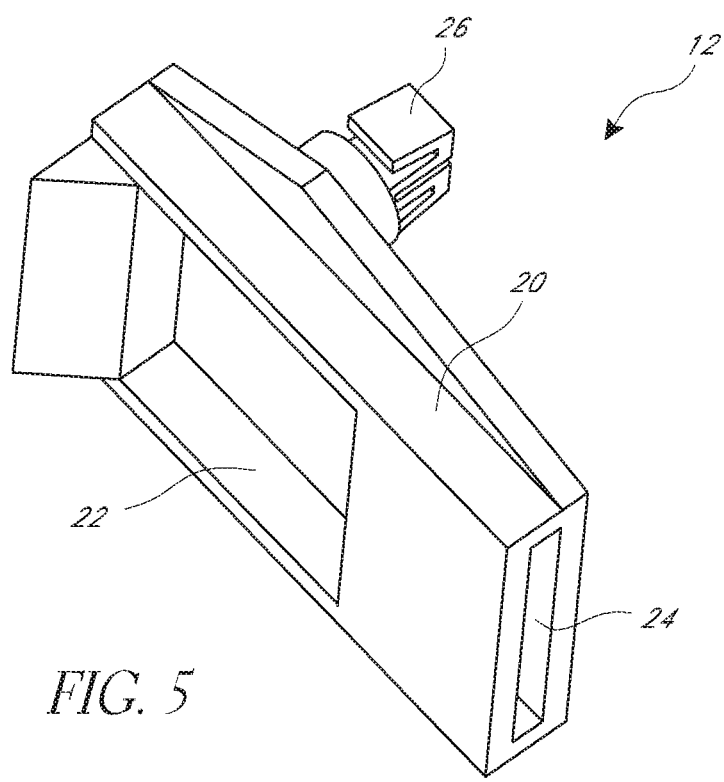
FIGS. 5-9 are views of a v-notch socket of the drawer glide mechanism of FIG. 8.
Figure 6:
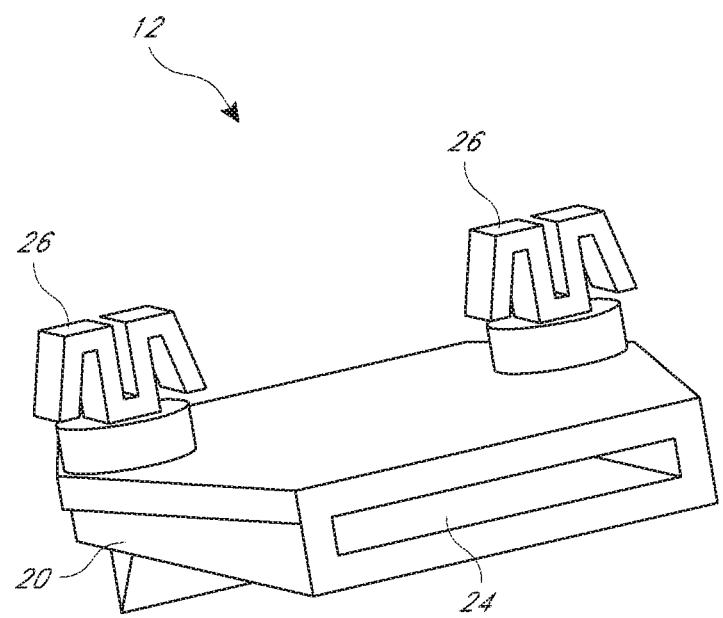
Figure 7:
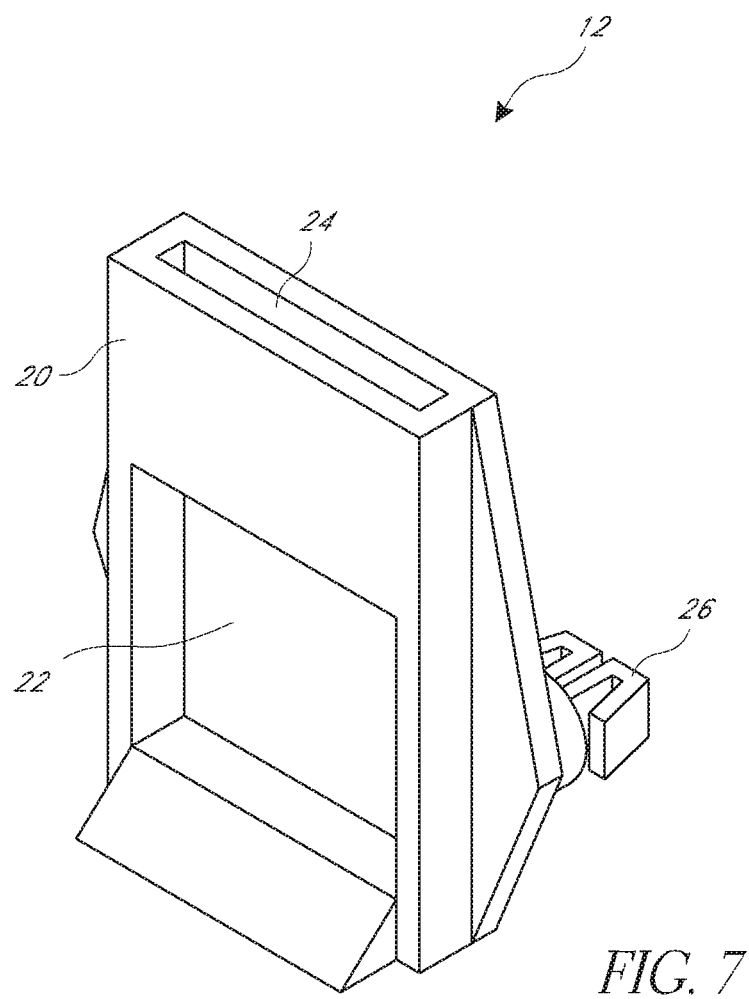
Figure 8:
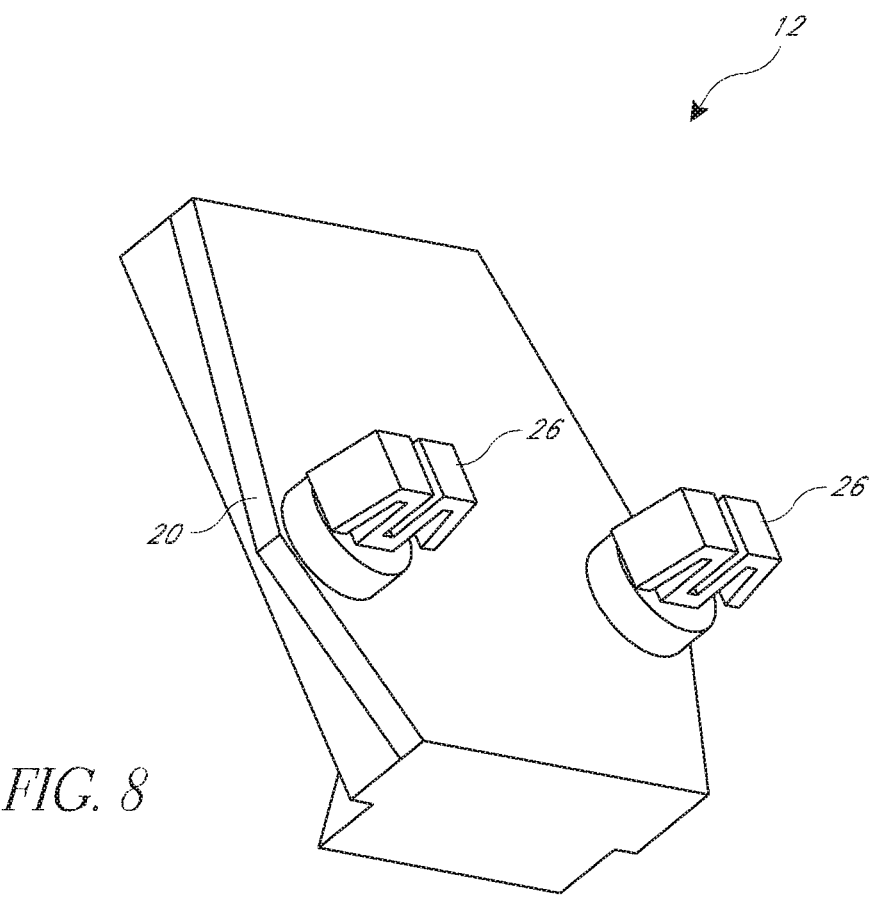

With reference to FIGS. 1-4, a drawer glide mechanism 10 can comprise a v-notch socket 12, a first elongate guide member 14, a ball bearing component 16, and a second elongate guide member 18. The first elongate guide member 14 and second elongate member 18 can comprise elongate pieces of metal, plastic, or other suitable material. The first elongate guide member 14 can be coupled (e.g. releasably coupled) to the v-notch socket 12, and/or can also be coupled to the second elongate guide member 18. For example, the second elongate guide member 18 can be nested within the first elongate guide member 14. The ball bearing component 16 can be nested between the first elongate guide member 14 and second elongate guide member 18. The second elongate guide member 18 can be free to move (e.g. glide) relative to the first elongate guide member 14 in at least one direction via the ball bearing component 16. For example, the second elongate guide member 18 can glide alongside a length the first elongate guide member 14, generally parallel to the first elongate guide member 14. Other arrangements of the first elongate guide member 14 and second elongate guide member 18 are also possible. For example, in some embodiments the first elongate guide member 14 can be nested within the second elongate guide member 18. In some embodiments one or more of the elongate guide members 14, 18 can be telescopingly engaged with one another. In some embodiments more than two elongate guide members can be used. In some embodiments more than one ball bearing component 16 can be used.

With reference to FIGS. 5-9, the v-notch socket 12 can comprise a body portion 20, a first opening 22, a second opening 24, and at least one protruding v-notch dowel portion 26. The body portion 20 can be comprised of plastic, or other suitable material. The first opening 22 can, for example, be cut out of, or molded as part of, the body 20. The first opening 22 can be located on a front-facing portion of the v-notch socket 12. The first opening 22 can be large enough to receive a distal end of the first elongate guide member 14. The second opening 24 can, for example, be cut out of or molded as part of, the body 20. The second opening 24 can be located on a side-facing portion of the v-notch socket 12. The second opening 24 can be large enough to receive at least a portion of the distal end of the first elongate guide member 14. In some embodiments, the first and second openings 22, 24 can be continuous, and linked together, such that they form one opening and pathway through the body of the v-notch socket 12.

Figure 9:
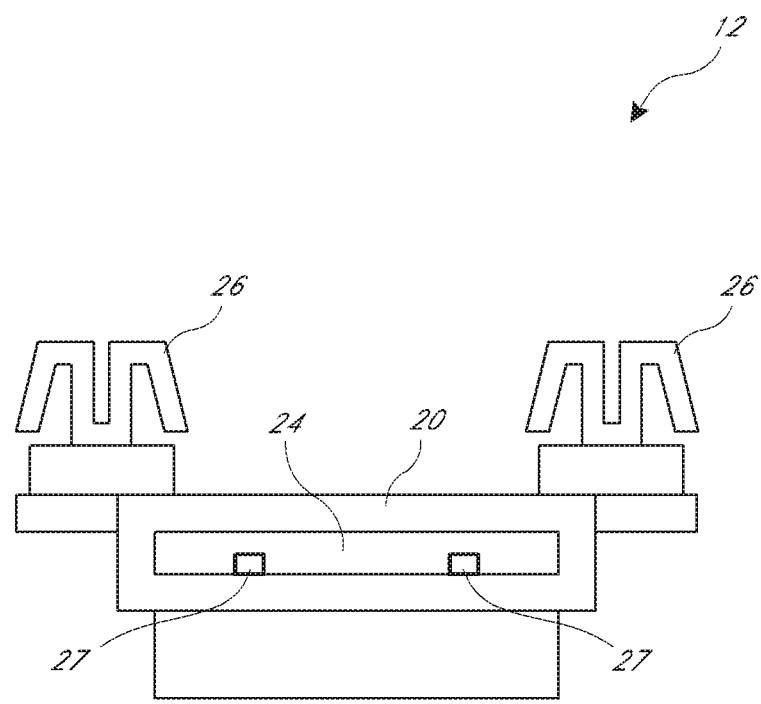

With continued reference to FIGS. 5-9, the at least one v-notch dowel portion 26 can comprise, for example, a plastic dowel piece that is integrally formed with (e.g. molded with) the body portion 20. The v-notch dowel portion 26 can extend from a back-facing portion of the v-notch socket 12. The v-notch dowel portion 26 can extend from the body 20 on an opposite side of the body 20 as the first opening 22. In some embodiments, the v-notch socket 12 can have two v-notch dowel portions 26, though other numbers are also possible. The v-notch dowel portions 26 can be configured to be inserted into the back side paneling of a drawer cabinet. Specifically, the v-notch dowel portions 26 can be configured to be inserted into a relatively thin back side drawer panel. For example, in some embodiments, the v-notch dowel portions 26 can be configured to be inserted into a thin back side drawer panel that is no greater than 5 mm in thickness. In some embodiments the v-notch dowel portions 26 can be configured to be inserted into a back side drawer panel that is no greater than 4 mm in thickness. In some embodiments the v-notch dowel portions 26 can be configured to be inserted into a back side drawer panel that is no greater than 3 mm in thickness. In some embodiments the v-notch dowel portions 26 can be configured to be inserted into a back side drawer panel that is no greater than 2 mm in thickness. Other ranges and values are also possible. Thus, at least in some embodiments, plastic v-notch dowel portions 26 and a plastic v-notch socket 12 can facilitate holding an attached metal first elongate guide member 14, metal ball bearing component 16, and metal second elongate guide member 18 in place within a drawer cabinet, even if the drawer cabinet has relatively thin paneling. With reference to FIG. 9, in some embodiments the v-notch socket 12 can include one or more tabs 27. The tabs 27 can be used to help guide a distal end of the first elongate guide member 14. The tabs 27 can be used to help generally hold (e.g. frictionally) a distal end of the first elongate guide member 14 in place and inhibit or prevent movement of the distal end of the first elongate guide member 14 relative the v-notch socket 12 in at least one direction.

Figure 10:
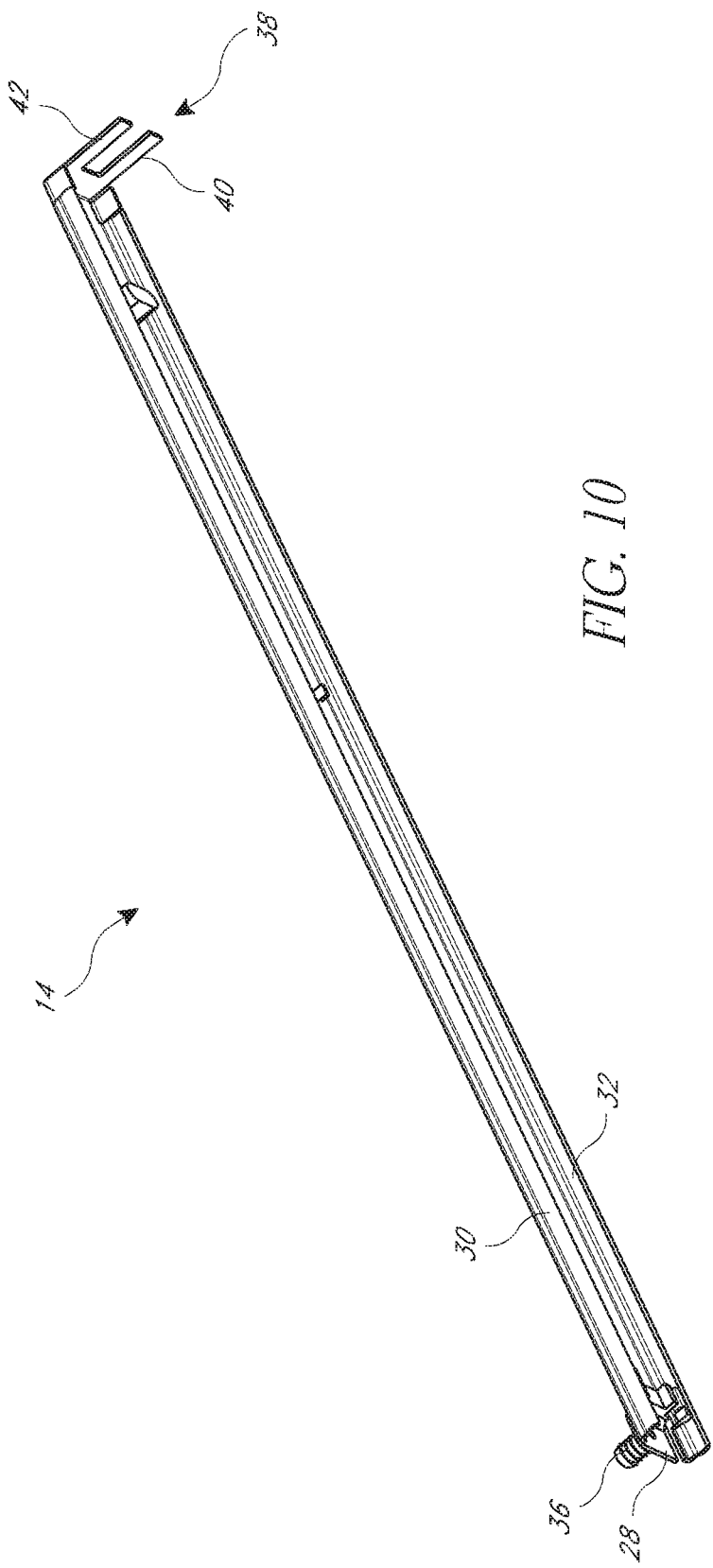
FIGS. 10 and 11 are perspective view of a first elongate guide member of the drawer glide mechanism of FIG. 1.
Figure 11:
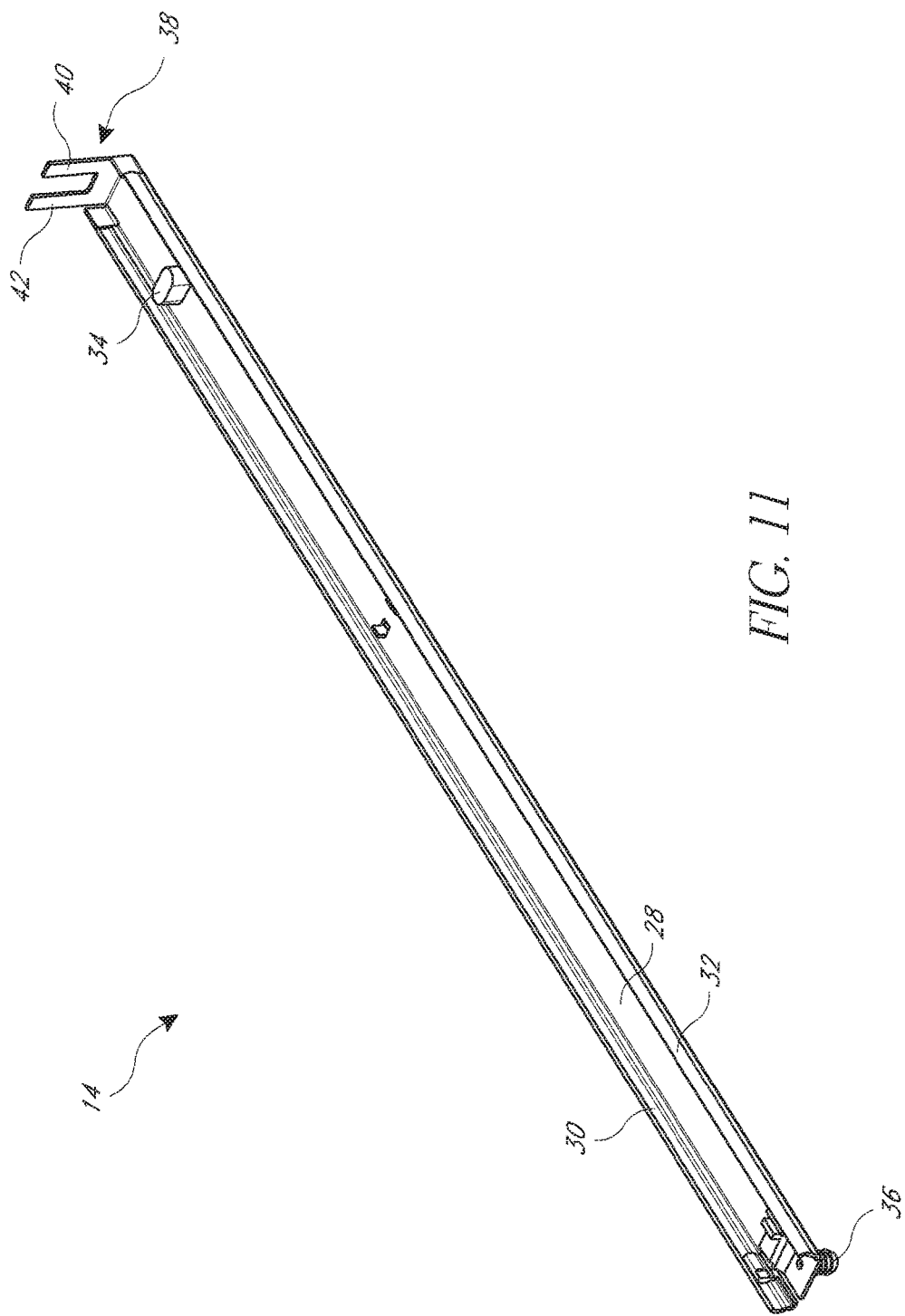

With reference to FIGS. 10 and 11, the first elongate guide member 14 can comprise a web portion 28, a first flange portion 30 extending from the web portion 28, and a second flange portion 32 extending from the web portion 28. The web portion 28, first flange portion 30, and second flange portion 32 can form a generally U-shaped profile. Other configurations and shapes for the first elongate guide member 14 are also possible. The first elongate guide member 14 can also comprise a stop member 34. The stop member 34 can comprise a piece of plastic, rubber, or other material, configured to limit relative motion between the first elongate guide member 14 and second elongate guide member 18. The stop member 34 can be located generally at a distal end of the first elongate guide member 14, though other locations are also possible.

With continued reference to FIGS. 10 and 11, the first elongate guide member 14 can further comprise a sidewall attachment mechanism 36. The sidewall attachment mechanism 36 can comprise, for example, a plastic dowel that is rigidly affixed to one side of the first elongate guide member 14. The sidewall attachment mechanism 36 can be used, for example, to attach the first elongate guide member 14 to a face frame component or the inside side paneling of a drawer cabinet. Thus, in some embodiments, both the v-notch dowel portions 26 described above, as well as the sidewall attachment mechanism 36, can be used to help attach and/or generally fix the position and/or orientation of the first elongate guide mechanism 36 within a drawer cabinet.

With continued reference to FIGS. 10 and 11, the first elongate guide member 14 can comprise a distal end 38 that is bent relative to the generally longitudinally extending remaining portion of the first elongate guide member 14. For example, the distal end 38 can be bent at a generally 90 degree angle relative to the rest of the elongate guide member 14. The distal end 38 can be bent, for example, inwardly such that it will extend directly behind a drawer when the drawer is attached to the elongate guide members 14, 18. In some embodiments the distal end 38 can have a generally fork-shaped configuration, such that the distal end has both a first forked member 40 and a second forked member 42. In some embodiments the forked-shaped configuration can facilitate attachment of the distal end 38 into the first opening 22 of the v-notch socket 12 described above.

Figure 12:
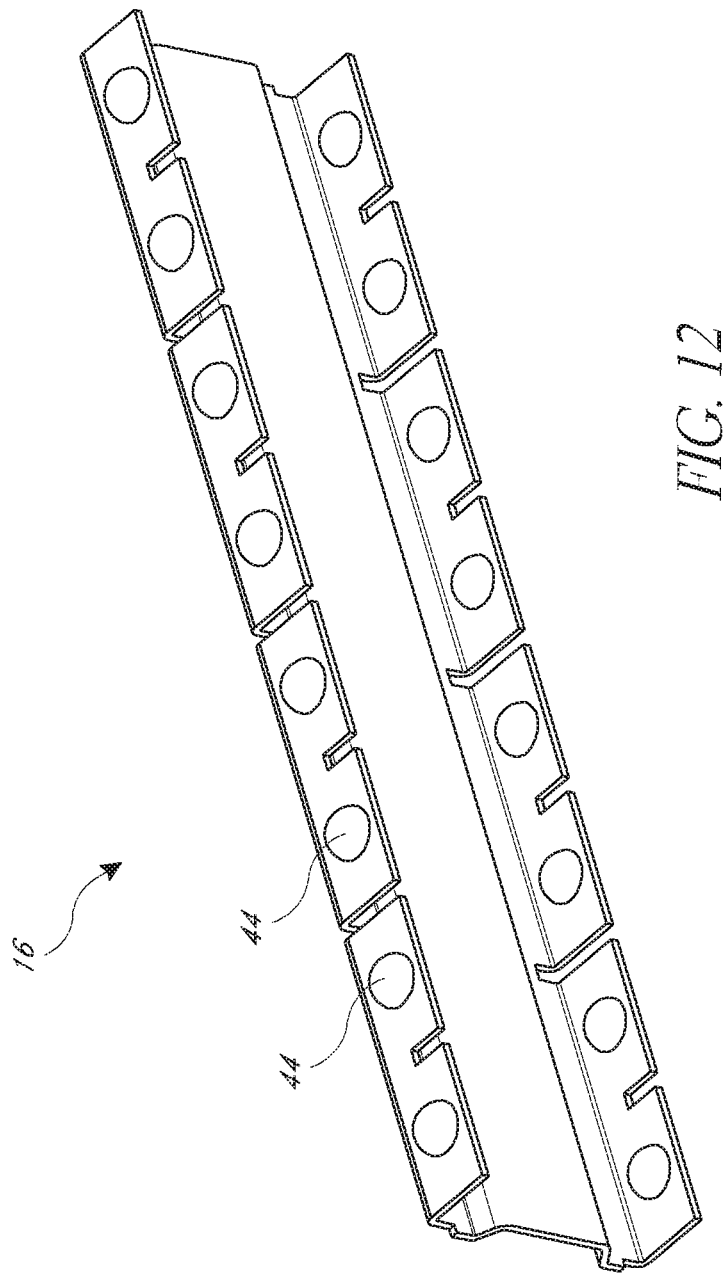
FIG. 12 is a perspective view of a ball bearing component of the drawer glide mechanism of FIG. 1.

With reference to FIG. 12, and as described above, the drawer glide mechanism 10 can comprise a ball bearing component 16 (e.g. what is commonly referred to as a race). The ball bearing component 16 can comprise a plurality of ball bearing rollers 44. The ball bearing rollers 44 can be spaced apart from one another and located along opposing sides of the ball bearing component 16. The ball bearing component 16 can be nested between the first elongate guide member 14 and second elongate guide member 18 so as to facilitate a smooth gliding motion between the first elongate guide member 14 and second elongate guide member 18.

With reference to FIGS. 12A-15, the second elongate guide member 18 can comprise a web portion 46, a first flange portion 48 extending from web portion 46, and a second flange portion 50 extending from web portion 46. The web portion 46, first flange portion 48, and second flange portion 50 can form a generally U-shaped profile. Other configurations and shapes for the second elongate guide member 18 are also possible.

Figure 12A:
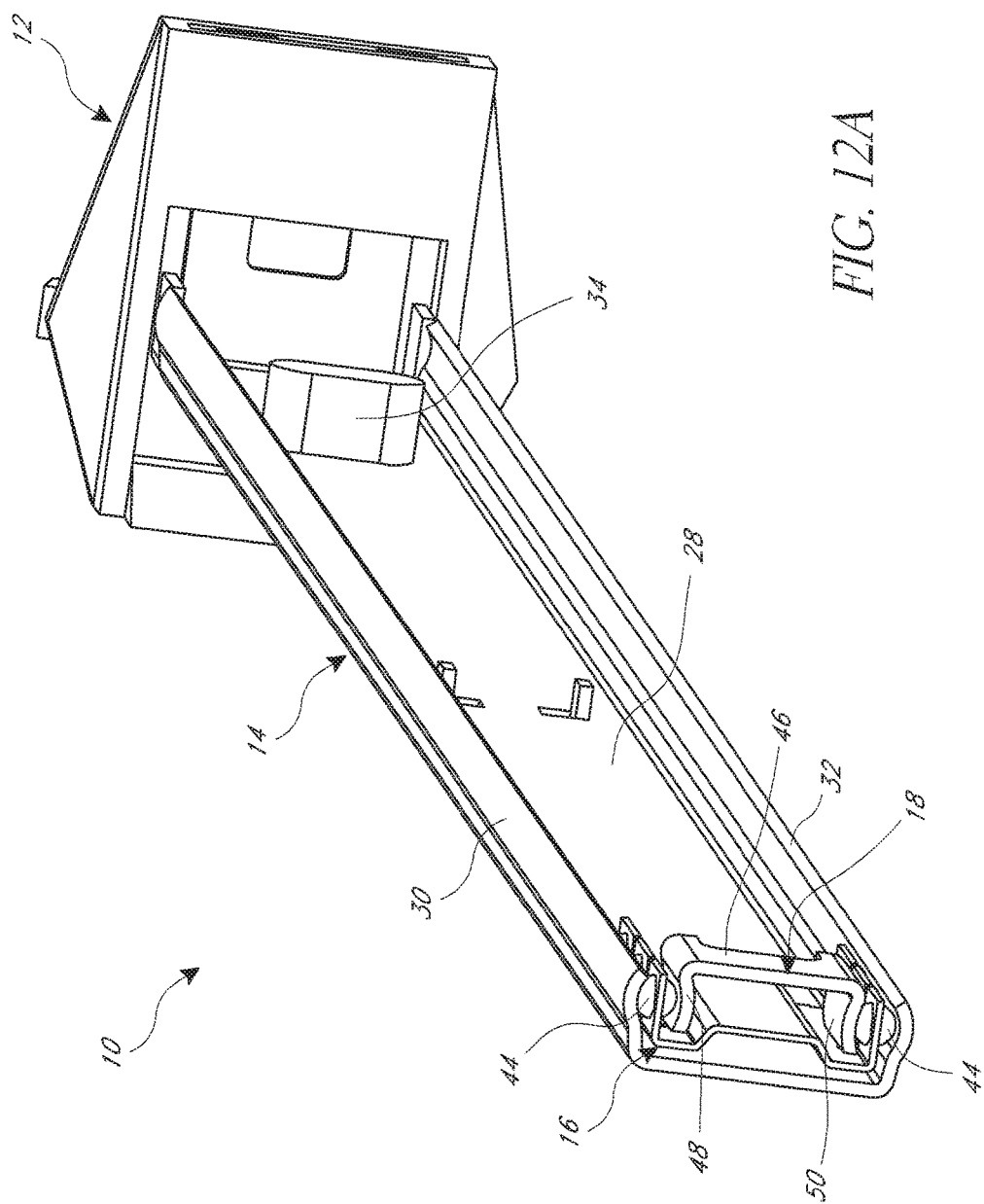
FIG. 12A is a perspective view of the cross-section taken along line A-A in FIG. 1.

As illustrated in FIG. 12A, the drawer glide mechanism 10 can optimally and advantageously include components that are nested and captured within one another, so as to severely restrict or entirely prohibit relative movement of components. For example, as illustrated in FIG. 12A, the first elongate guide member 14 can include the web portion 28 and first and second flange portions 30, 32. In some embodiments the first flange portion 30 can be shaped so as to curve over one set of the ball bearings 44 along the ball bearing component 16. Similarly, the second flange portion 32 can be shaped so as to curve over the other, opposite set of ball bearings 44 along the ball bearing component 16. Additionally, the second elongate guide member 18 can include the web portion 46 and first and second flange portions 48, 50. In some embodiments the first flange portion 48 can be shaped so as to curve over one set of ball bearings 44 along the ball bearing component 16. Similarly, the second flange portion 50 can be shaped so as to curve over the other, opposite set of ball bearings 44 along the ball bearing component 16. This curvature of the first flange portions 30, 48, and the second flange portions 32, 50 effectively captures the second elongate guide member 18 within the ball bearing component 16, and captures the ball bearing component 16 within the first elongate guide member 14. The overall capturing of these components severely restricts or entirely prohibits the second elongate guide member 18 from moving away from the first elongate guide member 14 in any direction other than along a path parallel to the second elongate guide member provided by the ball bearing component 16. Thus, the only relative movement of the first elongate guide member 14 and second elongate guide member 18 that is allowed is the relative sliding of the guide members 14, 18 along parallel paths. This arrangement advantageously provides for smooth operation.

Figure 13:
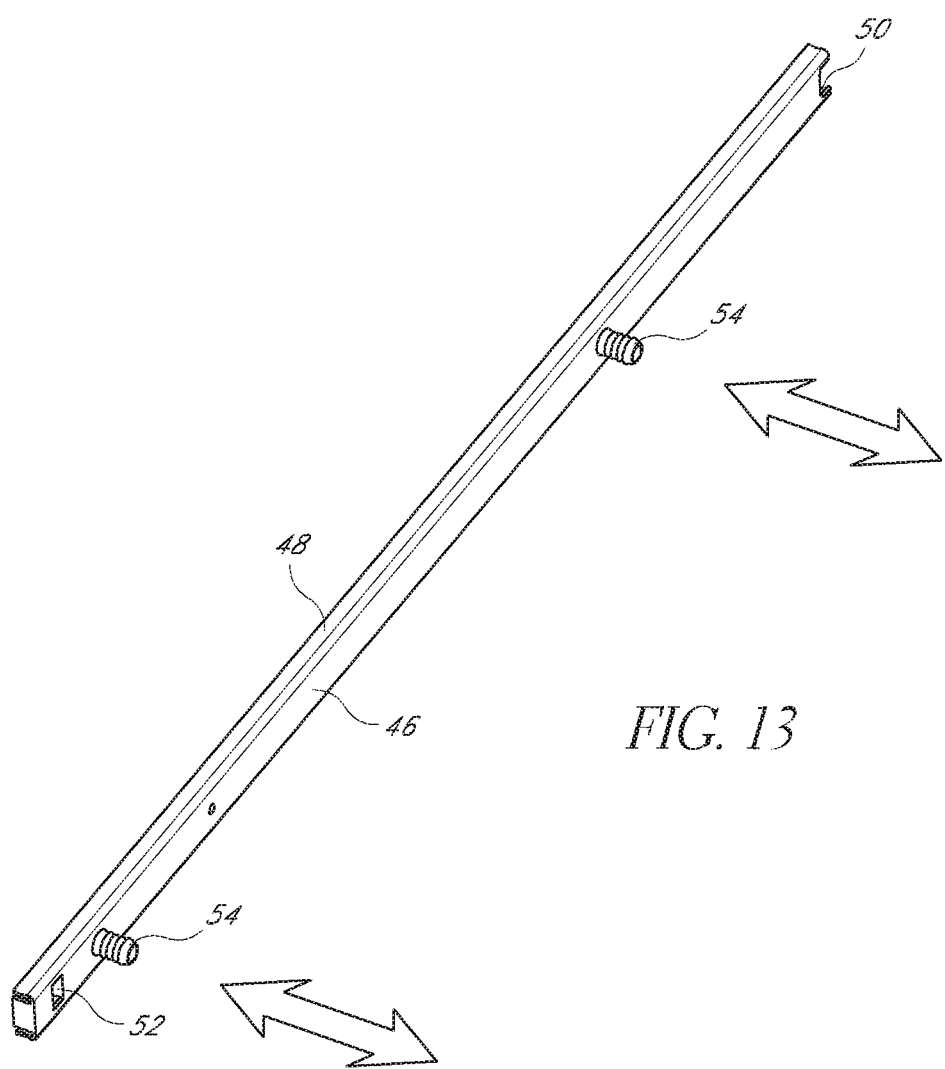
FIG. 13 is a perspective view of a second elongate guide member of the drawer glide mechanism of FIG. 1, illustrating a plurality of fixed and floating members attached thereto.
Figure 14:
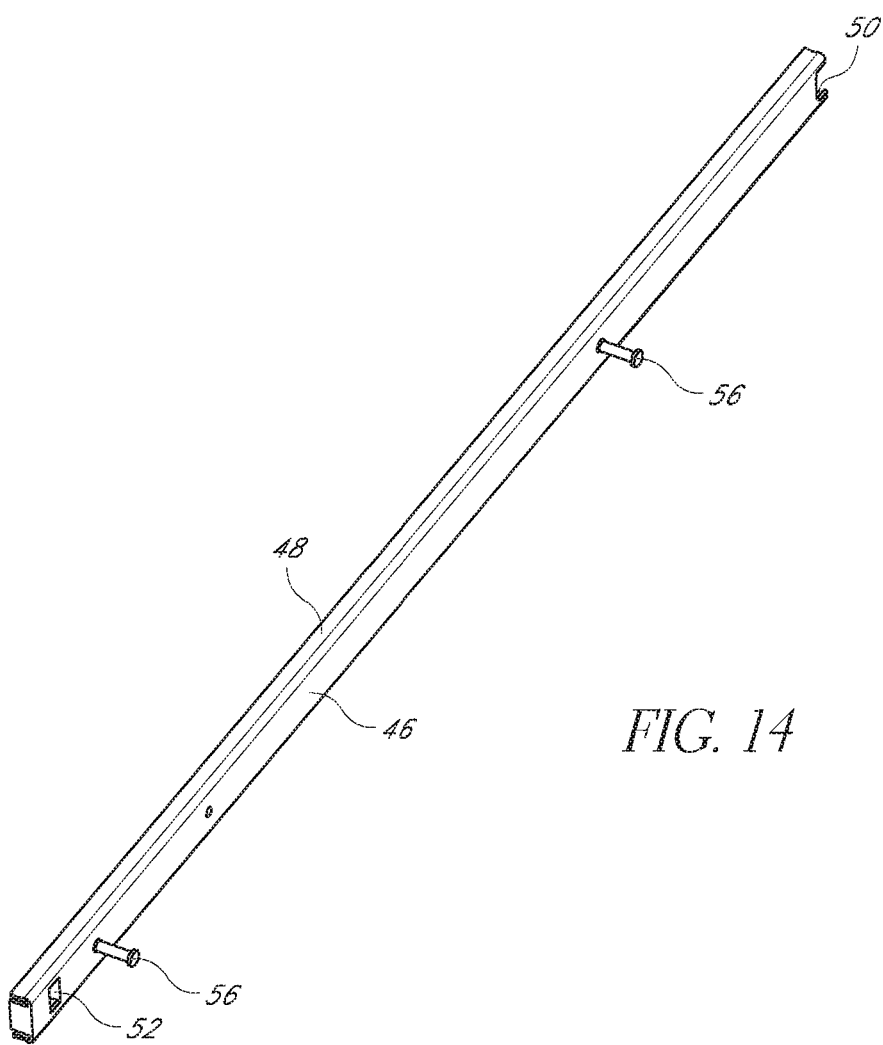
FIG. 14 is a perspective view of the second elongate guide member of the drawer glide mechanism of FIG. 1, illustrating removal of the floating members, with the fixed members remaining.
Figure 15:
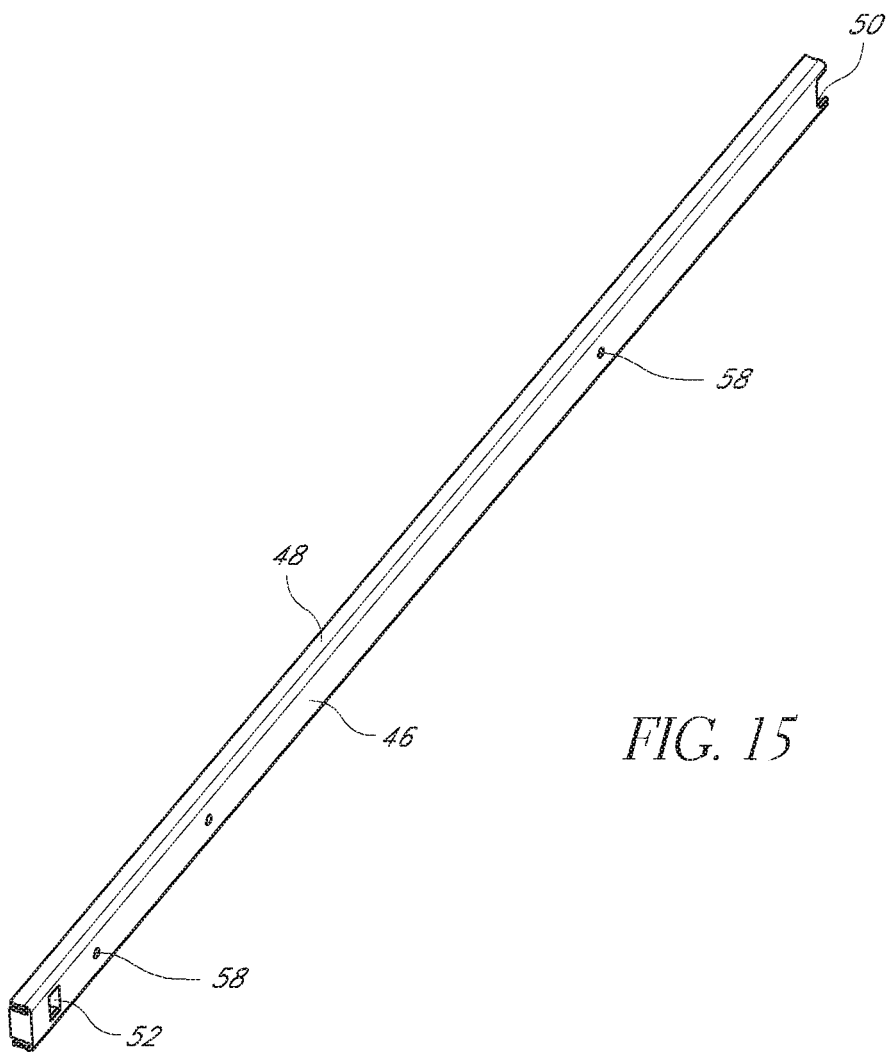
FIG. 15 is a perspective view of the second elongate guide member of the drawer glide mechanism of FIG. 1, illustrating removal of both the fixed and floating members.

With reference to FIGS. 13-15, the second elongate guide member 18 can also comprise at least one slot 52. The slot 52 can be located, for example, along a distal end of the second elongate guide member 18. The slot 52 can be used to allow for adjustability of an attached drawer. For example, the vertical slot 52 can allow for vertical adjustment of a drawer that is attached to the second elongate guide member 18. In some embodiments a fastener or other device can be inserted through the slot 52. Because of the size and shape of the slot 52, the fastener or other device can slide vertically up and down within the slot 52, thus allowing relative movement of the drawer to the second elongate guide member 18.

With reference to FIGS. 13-17, the drawer glide mechanism 10 can also comprise one or more structures that are adjustable to compensate for variations in drawer size, shape, and/or warping. For example, the drawer glide mechanism 10 can comprise at least one floating member 54, and at least one fixed member 56. The floating member 54 can be configured to attach directly to the side of a drawer, as well as to be attached, in a floating manner, to the fixed member 56. The fixed member 56 can be rigidly attached to, or integrally formed with, one or more of the first elongate guide member 14 and second elongate guide member 18. For example, a plurality of floating members 54 can comprise plastic dowels, and a plurality of fixed members 56 can comprise metal pins. The fixed members 56 can be attached to (e.g. welded to) locations 58 along the second elongate guide member 18, as seen in FIG. 15. The fixed members 56 can be spaced apart longitudinally along a length of the second elongate guide member 18. In some embodiments, more than two fixed members 56 can be used.

Figure 16A:
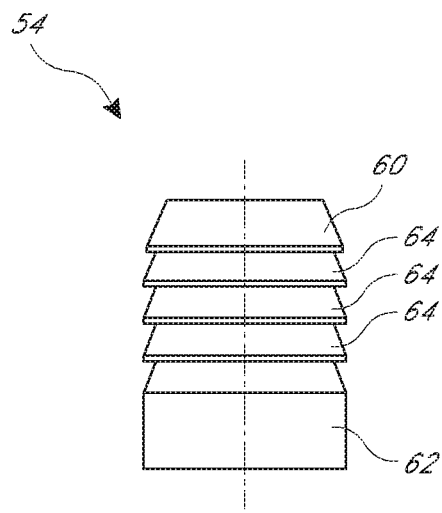
FIG. 16A is a front view of one of the floating members.
Figure 16B:
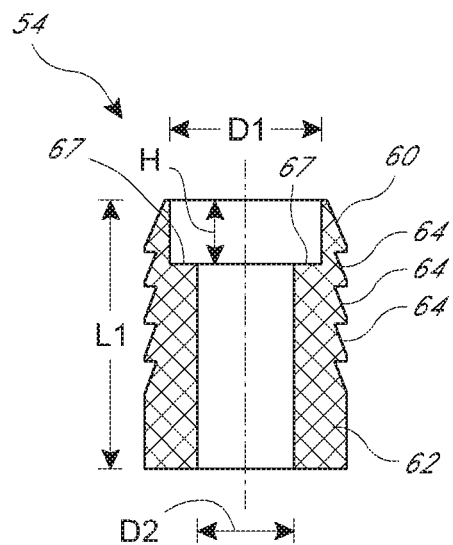
FIG. 16B is a cross-sectional view of the floating member of FIG. 16A.
Figure 16C:
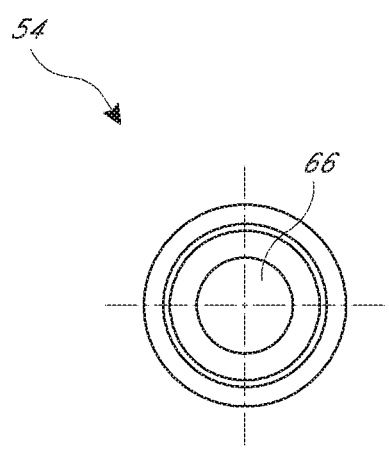
FIG. 16C is a bottom plan view of the floating member of FIG. 16A.

With reference to FIGS. 16A-C, in some embodiments the floating member 54 can comprise a first end 60, a second end 62, and a plurality of ridges 64 between the first end 60 and second end 62. The ridges 64 can be used to facilitate attachment of the floating member 54 to the side paneling of a drawer. The floating members 54 can be configured to be inserted into the side paneling of a drawer. Specifically, the floating members 54 can be configured to be inserted into a relatively thin side panel of a drawer. For example, in some embodiments, the floating members 54 can be configured to be inserted into a thin side paneling of a drawer that is no greater than 5 mm in thickness. In some embodiments the floating members 54 can be configured to be inserted into the side paneling of a drawer that is no greater than 4 mm in thickness. In some embodiments the floating members 54 can be configured to be inserted into the side paneling of a drawer that is no greater than 3 mm in thickness. In some embodiments the floating members 54 can be configured to be inserted into the side paneling of a drawer that is no greater than 2 mm in thickness. Other ranges and values are also possible.

In some embodiments the floating member 54 can have an overall length "L1" of no greater than 12 mm. In some embodiments the floating member 54 can have an overall length "L1" of no greater than 10 mm. In some embodiments the floating member 54 can have an overall length "L1" of no greater than 8 mm. Other ranges and values are also possible.

Figure 17:
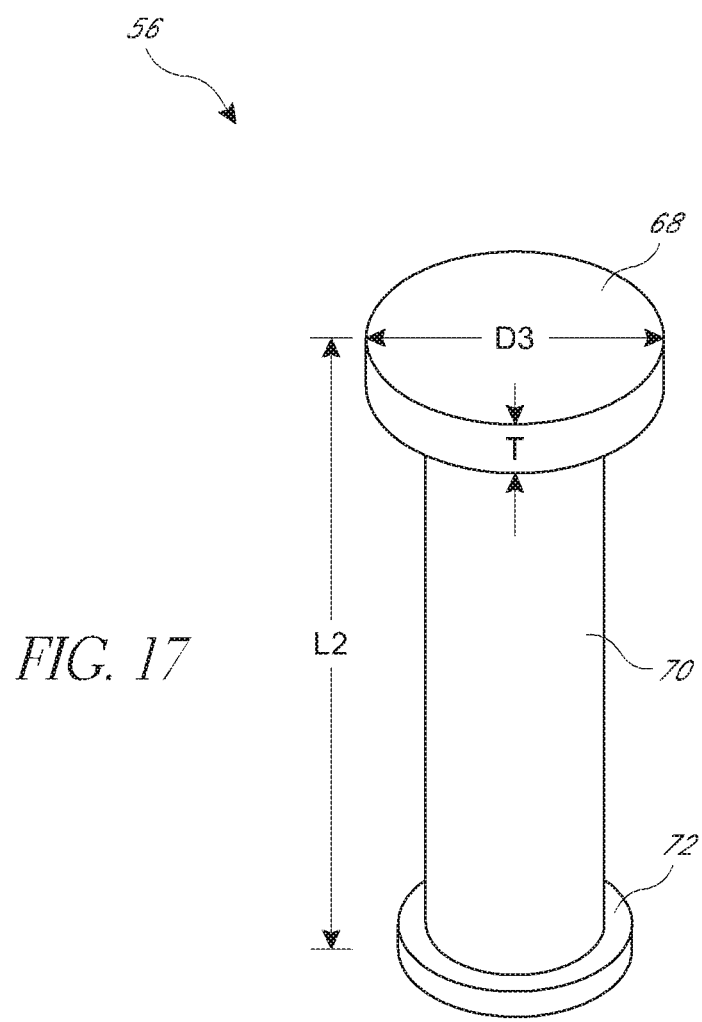
FIG. 17 is a perspective view of one of the fixed members.
Figure 17A:
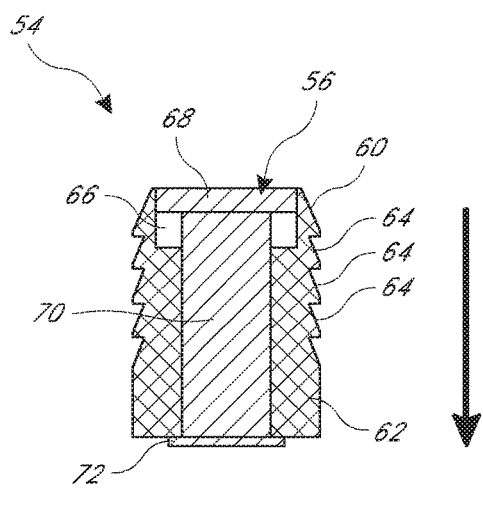
FIGS. 17A and 17B are cross-sectional views illustrating two different positions of one of the fixed and floating members.
Figure 17B:
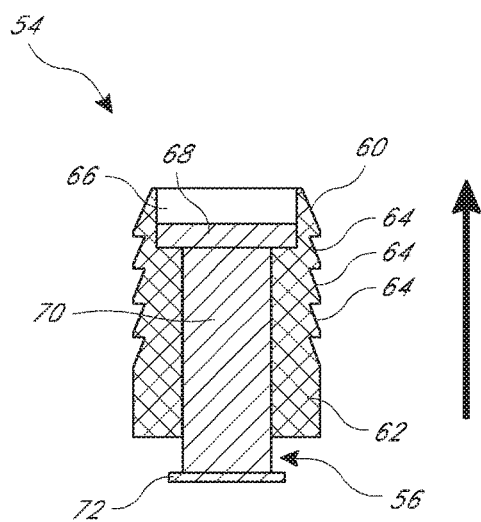

With reference to FIGS. 16B, 17A, and 17B, the floating member 54 can include at least one opening 66. In some embodiments the opening 66 can extend entirely through the floating member 54. For example, the opening 66 can extend from the first end 60 through to the second end 62. The opening 66 can be shaped and/or sized to accommodate one of the fixed members 56. For example, and as illustrated in FIG. 16B, the opening 66 can have a first diameter D1 near the first end 60 and a second, smaller diameter D2 near the second end 62. The two diameters D1, D2 can form ledges 67 within the floating member 54. The opening 66 can also have a length "H" where the opening 66 includes the first diameter D1.

As illustrated in FIG. 17, the fixed member 56 can comprise a first portion 68, a second portion 70, and a third portion 72. In some embodiments the fixed member 56 can have an overall length "L2" of no greater than 12 mm. In some embodiments the fixed member 56 can have an overall length "L2" of no greater than 10 mm. In some embodiments the fixed member 56 can have an overall length "L2" of no greater than 8 mm. Other ranges and values are also possible. In some embodiments the third portion 72 can be attached (e.g. via welding) to the locations 58 shown in FIG. 15. In some embodiments the first portion 68 can have a diameter D3. The diameter D3 can be larger than that of D2, but no greater than that of D1. The first portion 68 can also comprise a length "T". In some embodiments the length "T" can be smaller than the length "H."

With reference to FIGS. 16B, 17, 17A, and 17B, when the fixed member 56 is positioned within the floating member 54, the first portion 68 can sit within the portion of the opening 66 having the length "H." Because the diameter D3 of the first portion 68 of fixed member 56 is larger than the diameter D2 of the opening 66, the ledges 67 can work to prevent the floating member 54 from moving relative to the fixed member 56 past a fixed point. Thus, the floating member 54 can be limited in its movement in at least one direction (e.g. away from the second elongate guide member 18) due to the ledges 67. The floating member 54 can also be limited in its movement in a second direction (e.g. towards the second elongate guide member 18) by the floating member 54 contacting the first elongate guide member 14. The arrows in FIG. 13 illustrate available directions of movement of the floating members 54.

With reference to FIGS. 16B, 17, 17A, and 17B, because the length "H" of the opening 66 in the floating member 54 is larger than the length "T" of the first portion 68 of the fixed member 56, it is possible for the floating member 54 to slide relative to the fixed member 56 without the first portion 68 of the fixed member 56 ever extending out of the floating member 54. In some embodiments, for example, the ratio of the length "H" to the length "T" can be between approximately 1.0 and 1.5. In some embodiments the ratio of the length "H" to the length "T" can be between approximately 1.0 and 2.0. In some embodiments the ratio of the length "H" to the length "T" can be between approximately 1.0 and 3.0. Other values and ranges are also possible.

As illustrated by the arrows in FIGS. 13, 17A, and 17B, the movement of the floating member 54 can be generally transverse to the second elongate member 18. This movement permits adjustability and compensation for drawer warping along the side of the drawer. For example, and as described above, often times a drawer will be slightly warped and/or otherwise misshaped. When installing the drawer, the floating members 54 can be inserted into the side paneling of the drawer. Because one end of the drawer may be sticking out farther than another due to warping, the floating members 54 may end up moving out to different lengths along the arrow directions in FIG. 13. This allows the drawer to easily be attached to the second elongate guide member 18. Additionally, the use of floating members 54 and fixed members 56 allows for self-correction and self-adjustment of the drawer and drawer glide mechanism 10. Thus, the floating members 54 do not require additional mechanical adjustments once the drawer is installed. Rather, the very nature of the floating members 54 described above permits automatic self-adjustment, since the floating member 54 will slide over the fixed members 56 as needed to compensate for any warping in the drawer.

Figure 18:
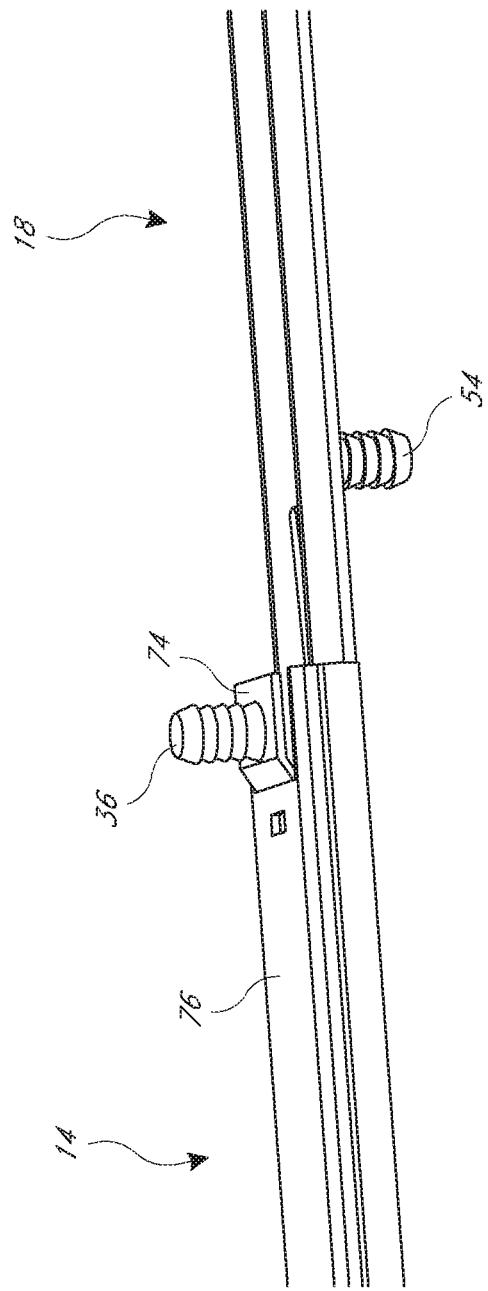
FIG. 18 is a partial perspective view of the drawer glide mechanism of FIG. 1, illustrating an embossed portion on a distal end of the first elongate guide member.

With reference to FIG. 18, the drawer glide mechanism 10 can also comprise at least one embossed portion 74 for spacing purposes when installing the drawer glide mechanism 10 within a drawer cabinet. For example, the drawer glide mechanism 10 can comprise an embossed portion 74 located generally at a distal end of the first elongate guide member 14. The embossed portion 74 can comprise a raised piece of metal along the first elongate guide member 14. The embossed portion 74 can act as a spacer within the interior of a drawer cabinet. For example, the embossed portion 74 can create a spacing between the first elongate guide member 14 and a face frame component or an inside side paneling of a drawer cabinet. This spacing can facilitate installation of the drawer glide mechanism 10, and help to prevent unwanted friction or contact between various components of the drawer glide mechanism 10, drawer, and/or drawer cabinet.

Figure 19:
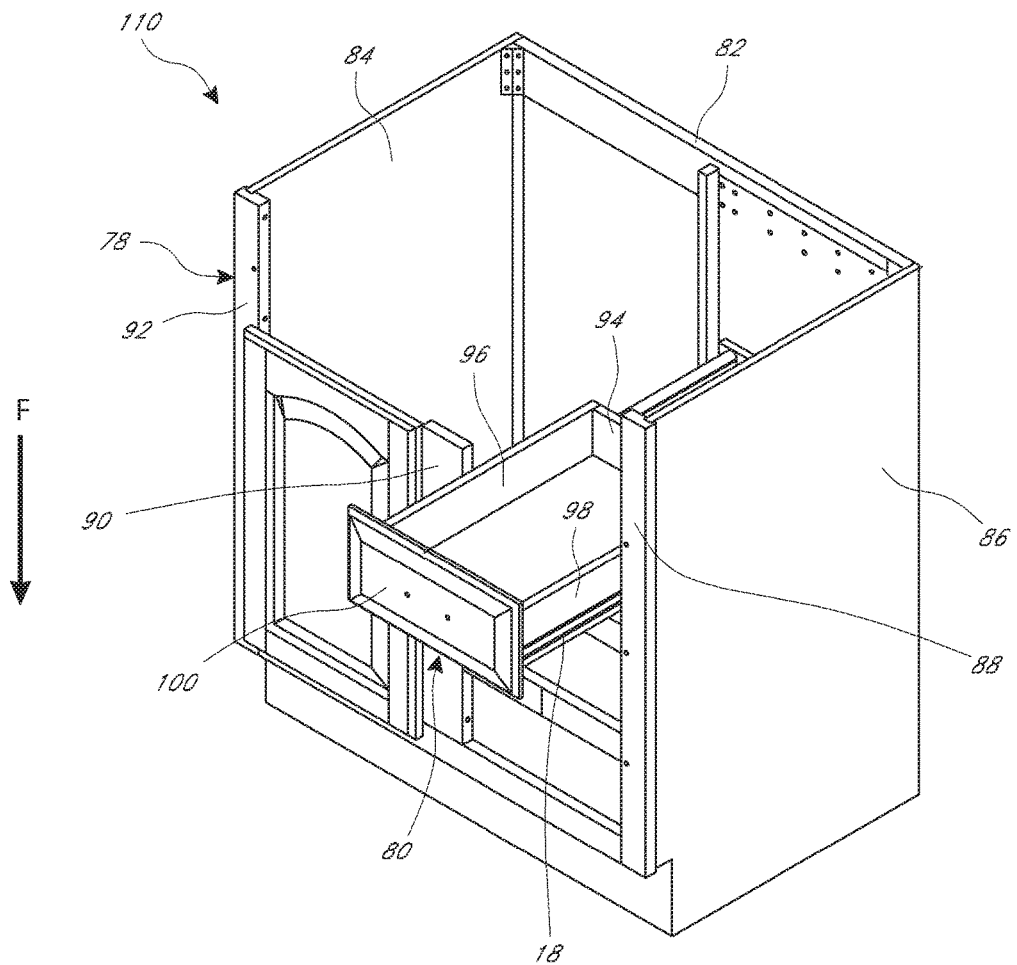
FIG. 19 is a perspective view of an embodiment of a drawer cabinet system including the drawer glide mechanism of FIG. 1.
Figure 20:
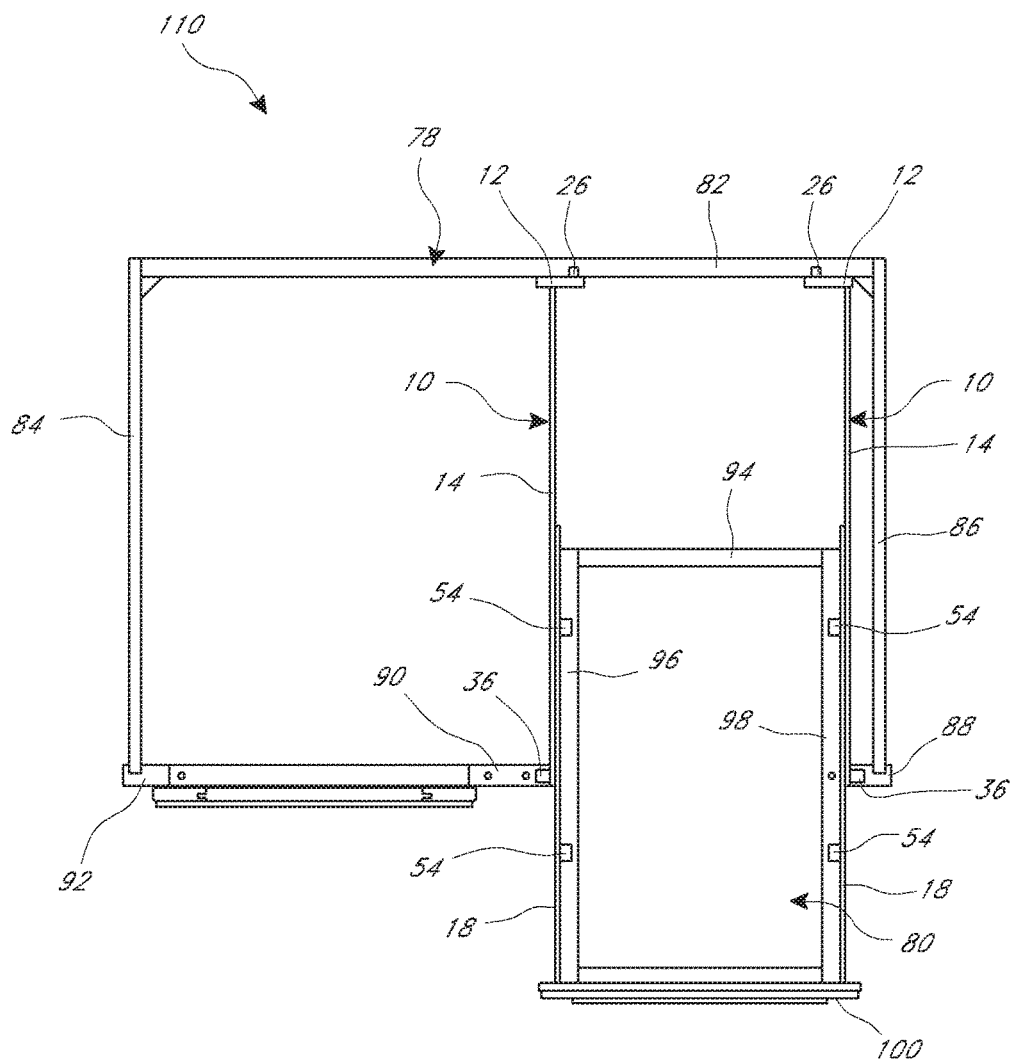
FIG. 20 is a top plan view of the drawer cabinet system of FIG. 19.

With reference to FIGS. 19 and 20, an embodiment of a drawer system 110 can include two drawer glide mechanisms 10, a drawer cabinet 78, and a drawer 80. The drawer cabinet 78 can include a back side panel 82 and at least two sidewall panels 84, 86. The two drawer glide mechanisms 10 can be attached to the back side panel 82. For example, and as described above, the drawer glide mechanisms 10 can include dowel portions 26 that are configured to extend into the back side panel 82. The dowel portions 26 can hold the v-notch sockets 12 in place. In embodiments where the drawer cabinet 110 is a face frame cabinet, the drawer cabinet 78 can also include one or more face frame components. For example, and as illustrated in FIGS. 19 and 20, the drawer cabinet 78 can include face frame components 88, 90, and 92. The face frame components 88, 90, 92 can provide a framework within which one or more drawers or cabinet doors can be fitted. Additionally, the face frame components 88 and 90 can be used to anchor the first elongate guide member 14. For example, and with reference to FIGS. 18 and 20, the sidewall attachment mechanisms 36 described above can be inserted into the face frame components 88 and 90. The sidewall attachment mechanisms 36 can be inserted such that the face frame components 88 and 90 are generally flush with the embossed portion 74 of the first elongate guide member 14.

With continued reference to FIGS. 19 and 20, the drawer 80 can include a back drawer panel 94, two side drawer panels 96, 98, and a front drawer panel 100. The drawer glide mechanisms 10 can be attached to the drawer 80 via the floating members 54 and fixed members 56 described above. For example, and with reference to FIG. 20, the floating members 54 can be inserted into the side drawer panels 96, 98. The floating members 54 and fixed members 56 can accommodate for any warped portions of the side drawer panels 96, 98. As illustrated in FIG. 19, the drawer glide mechanisms 10 can permit the drawer 80 to be moved in and out of the drawer cabinet 78. When the drawer 80 is moved into the drawer cabinet 78, the front drawer panel 100 can rest against portions of the face frame components 88, 90.

While the embodiment of the drawer system 110 illustrated in FIGS. 19 and 20 is shown having drawer glide mechanisms 10 that are used in a face frame drawer cabinet 78, the drawer glide mechanisms 10 can also be used in frameless cabinets. For example, the drawer glide mechanisms 10 can be attached to the back side paneling of a frameless drawer cabinet with the v-notch socket 12, as well as to one or more side panels or other structures within a frameless cabinet. Thus, the drawer glide mechanism 10 can be used in a variety of settings within different types of kitchen and bathroom cabinets to facilitate drawer installation and movement.

Figure 21:
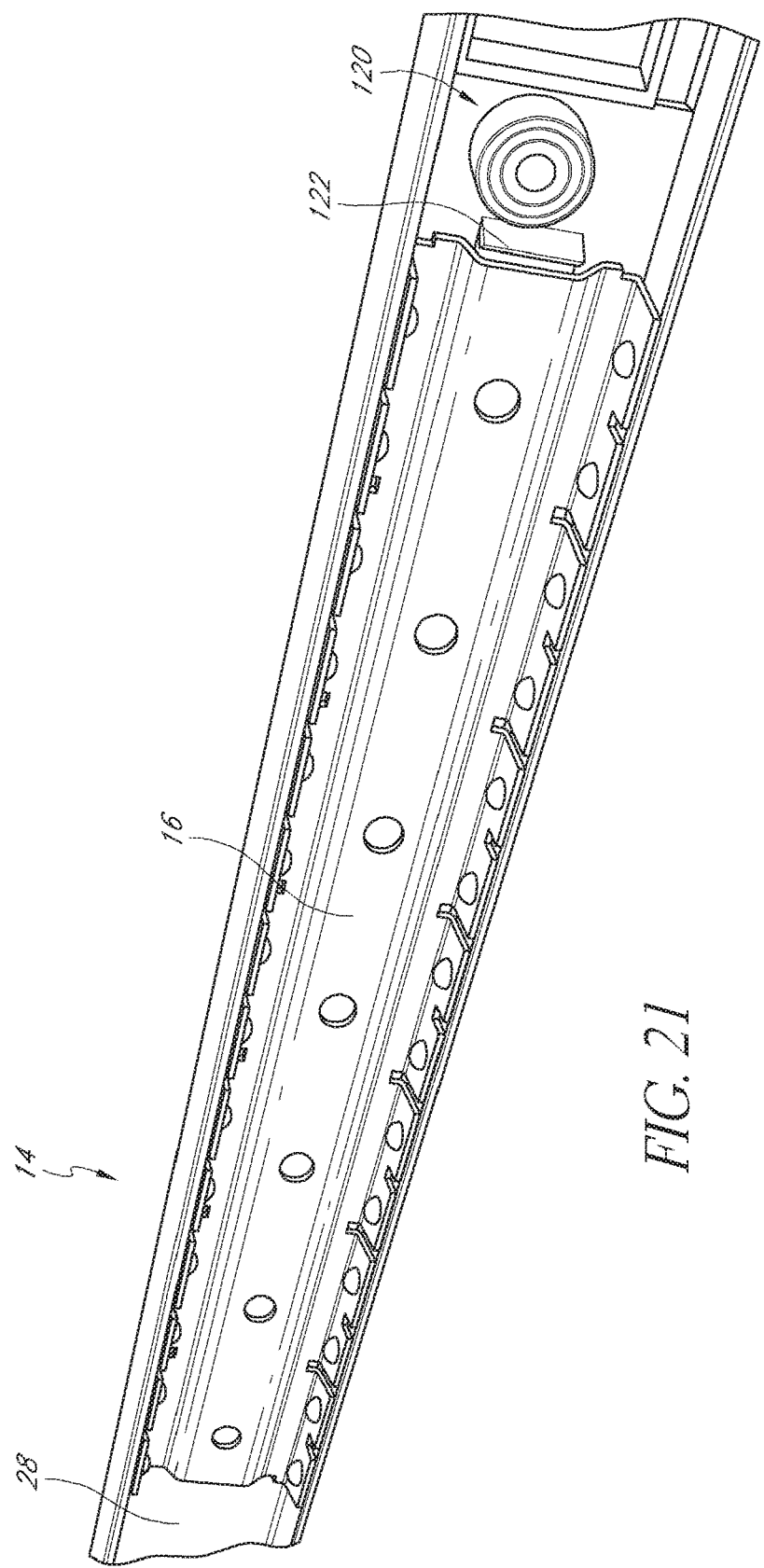
FIG. 21 is a perspective view of another embodiment of a drawer glide mechanism.
Figure 23:
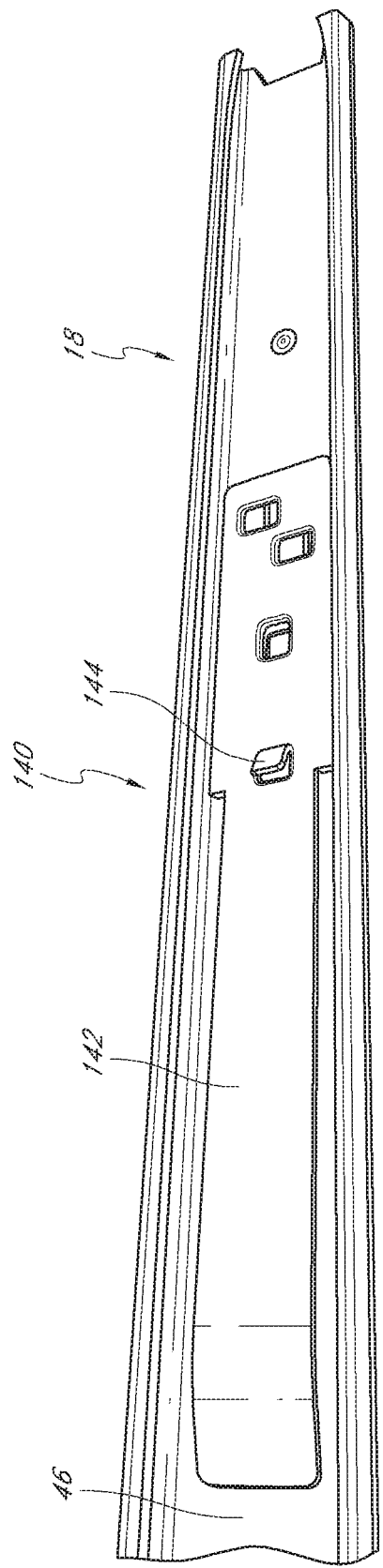
FIG. 23 is a perspective view of a release mechanism of the drawer glide mechanism of FIG. 21.

FIGS. 21-23 illustrate an embodiment of a drawer glide mechanism 10' having some features in common with the drawer glide mechanism 10 described above. As illustrated in FIGS. 21 and 22, the drawer glide mechanism 10' can include a roller support 120. The roller support 120 can be attached (e.g., via welding, a rivet, or other fasteners and/or fastening methods) to the first elongate guide member 14. For example, the roller support 120 can be attached to the web portion 28 of the elongate member 14.

The roller support 120 can be positioned adjacent the proximal end (e.g., front end) of the first elongate guide member 14 corresponding to the end from which the second elongate guide member 18 extends (e.g., the end corresponding to the front of the cabinet or other structure in which the drawer is installed). For example, the roller support 120 can be attached a distance 121 from the distal end (e.g., back end) of the first elongate guide member 14. The distance 121 between the roller support 120 and the distal end of the first elongate guide member 14 can be greater than about 75%, greater than about 80%, greater than about 85%, greater than about 90%, and/or greater than about 95% of the length L of the elongate guide member 14. In some embodiments, the distance 121 between the roller support 120 and the distal end of the first elongate guide member 14 is between about 92% and about 98% of the length L of the first elongate guide member 14.

In some cases, front loading of the drawer 80 can cause a proximal portion of the second elongate guide member 18 to bend or deflect downward. For example, downward force F (see, e.g., FIG. 19) on a front end of the drawer 80 can deflect the portion of the second elongate guide member 18 which is proximal to the proximal end of the ball bearing component 16. In some embodiments, the roller support 120 can provide support to the proximal portion of the second elongate guide member 18 when a downward force F (e.g., due to front loading or otherwise) is applied to the front of the drawer. For example, a portion of the second elongate guide member 18 can contact and/or receive support from the roller support 120 when a force F greater than a force of gravity on the back of the drawer 80 is applied at or near the front end of the drawer 80. In one embodiment, the portion of the second elongate guide member 18 can contact and/or receive support from the roller support 120 when moment about the lower front end of the ball bearing component is greater than a predetermined force or is greater than the moment about the upper front end of the ball bearing component. The roller support 120 can provide low-friction support to the second elongate guide member 18 as compared to support which may otherwise be provided by a non-rotatable and/or static support structure. The roller support 120 can be positioned (e.g., vertically) and/or sized (e.g., by diameter) such that the second elongate guide member 18 does not contact the roller support 120 during normal opening and closing of the drawer when the drawer is loaded in a normal or evenly-distributed manner. For example, the roller support 120 can be sized and shaped such that the second elongate guide member 18 only contacts the roller support 120 when the drawer 80 is front loaded and/or when a sufficient downward force is applied to a front portion (e.g., proximal portion) of the drawer 80.

In some embodiments, the roller support 120 is sized and shaped such that the second elongate guide member 18 only contacts the roller support 120 when a proximal end (e.g., extending end) of the second elongate guide member 18 is below a distal end of the second elongate guide member 18. In some embodiments, the roller support is sized and shaped such that the second elongate guide member 18 only contacts the roller support 120 when a front or proximal end (e.g., extending end) of the second elongate guide member 18 is at least 1/32 of an inch, at least 1/16 of an inch below, at least 3/32 of an inch below, at least 1/8 of an inch below, at least 5/32 of an inch below or at least 1/4 of an inch below a back or distal end of the second elongate guide member 18. This condition may occur when the drawer 80 is subject to uneven loading (e.g., front loading), as described above. In some cases, the roller support 120 contacts and supports a portion of the elongate guide member 18 when the drawer 80 is opened. For example, opening the drawer 80 can move the center of gravity of the drawer forward or proximally away from (e.g., in a direction toward the front of the drawer 80 with respect to the back of the drawer 80) the portion of the drawer 80 which is supported by the ball bearing component 16. In some such cases, the front end of the drawer 80 can move downward under the force of gravity such that the second elongate guide member 18 engages the roller support 120.

As illustrated in FIG. 22A, the roller support 120 can have a diameter D4 that is less than a width W1 of the second elongate guide member 18 (e.g., a distance between the first and second flanges 48, 50 of the second elongate guide member 18). In some embodiments, the diameter D4 of the roller support 120 is less than 90%, less than 85%, less than 75%, less than 65%, less than 50%, and/or less than 30% of the width W1 of the second elongate guide member 18. In some cases, the diameter D4 of the roller support 120 is approximately 2/3 of the width W1 of the second elongate guide member 18.

In some embodiments, the roller support 120 is positioned closer to one of the flanges 30, 32 (e.g., the upper flange, when the drawer glide mechanism 10' is installed on a drawer) of the first elongate guide member 14 than to the other flange 30, 32 (e.g., the lower flange, when the drawer glide mechanism 10' is installed on a drawer). For example, the roller support 120 can be positioned closer to the upper flange than to the lower flange. In some embodiments, a distance 123 between rotational center of the roller support 120 and the lower flange is greater than 1/2, greater than 9/16, greater than 5/8, greater than 3/5, greater than 3/4, and/or greater than 4/5 of a width W2 of the first elongate guide member 14. In some embodiments, the distance 123 is between about 55% and about 65% of the width W2 of the first elongate guide member 14.

As illustrated in FIG. 23, a release member 140 can be connected (e.g., adhered, crimped, fastened, welded, or otherwise) to the second elongate guide member 18. For example, the release member 140 can be connected to the web portion 46 of the second elongate guide member 18. The release member 140 can have a length defined between a first end (e.g., proximal end) and a second end (e.g., distal end). The release member 140 can include an obstructing portion 144 between the first and second ends of the release member 140. The obstructing portion 144 can be a protrusion, tab, or other surface feature extending from the second elongate guide member 18 toward the first elongate guide member 14 when the second elongate guide member 18 is coupled to the first elongate guide member 14.

The release member 140 can transition between an obstructing position and a releasing position. In some embodiments, the release member 140 is biased to the obstructing position. The obstructing portion 144 can be configured to inhibit decoupling of the second elongate guide member 18 from the first elongate guide member 14 when the release member 140 is in the obstructing position. For example, the obstructing portion 144 of the release member 140 can be positioned and/or sized to interfere with a stop 122 (e.g., a tab, a protrusion, or other feature) on the first elongate guide member 14.

The stop 122 can extend from the web portion 28 of the first elongate guide member 14 toward the second elongate guide member 18 when the second elongate guide member 18 is coupled with the first elongate guide member 14. The stop 122 can be positioned between and spaced apart from the first and second flange portions 30, 32 of the first elongate guide member 14. In some embodiments, the stop 122 is formed by bending a portion of the web portion 28 in a direction toward the second elongate guide member 18 when the second elongate guide member 18 is coupled with the first elongate guide member 14. Interference between the obstructing portion 144 and the stop 122 of the first elongate guide member 14 can inhibit proximal movement of the second elongate portion 18 past a predetermined maximum extension point (e.g., a point corresponding to a fully extended position of the drawer 80) with respect to the first elongate guide member 14. The stop 122 can be positioned distal of roller support 120. In some embodiments, the stop 122 inhibits or prevents movement of the ball bearing component 16 in the proximal direction past the stop 122 (see, e.g., FIG. 21). Inhibiting movement of the ball bearing component 16 past the stop 122 can reduce the likelihood that the ball bearing component 16 decouples from the first elongate guide member 14.

The release member 140 can be transitioned to the releasing position upon application of force upon the release member 140 in a direction toward the second elongate guide member 18 (e.g., toward the web portion 46). For example, force may be applied to an actuation portion 142 of the release member 140 between the first and second ends of the release member 140 to deflect the obstructing portion 144 away from the first elongate guide member 14. Preferably, a release member 140 is connected to each of the second elongate guide members 18 on either side of the drawer 80. In some cases, each of the release members 140 installed on the second elongate guide members 18 is similar or identical in constructions. In some such cases, torsional and other forces on the drawer 80 can be reduced when the direction of force required to transition the release member 140 to the releasing configuration is toward the second elongate guide members 80 (e.g., toward the drawer 80).

Figure 24:
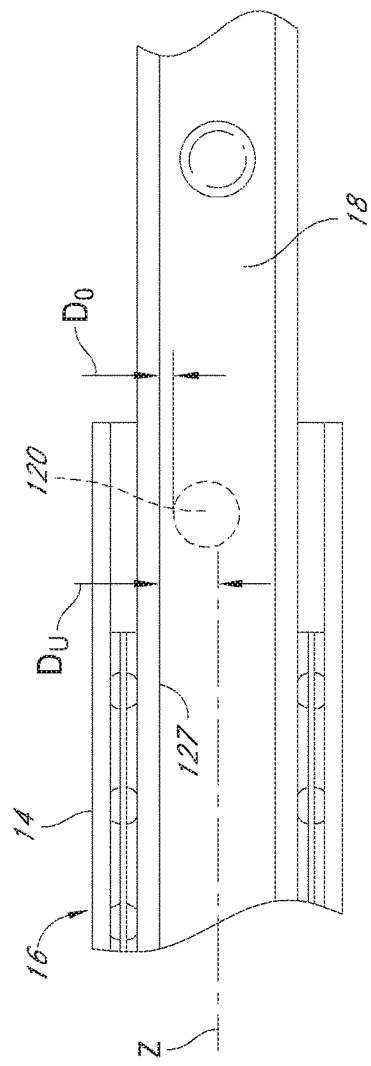
FIG. 24 is a close up view of the drawer glide mechanism of FIG. 22, wherein the second elongate guide member is in a first position.
Figure 25:
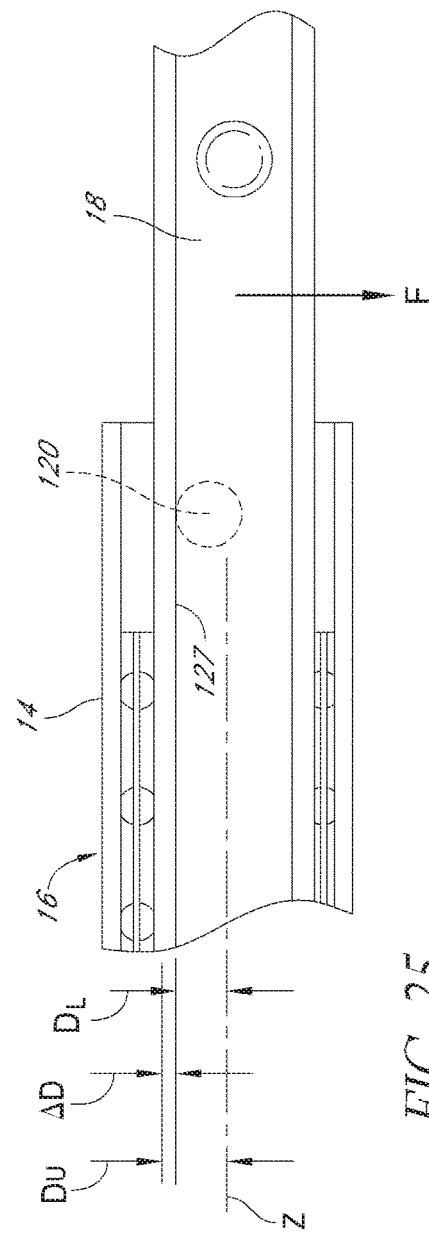
FIG. 25 is a close up view of the drawer glide mechanism of FIG. 22, wherein the second elongate guide member is in a second position, contacting the roller guide.

As illustrated in FIGS. 24-25, the first elongate guide member 14 can have an axis Z. The axis Z can extend along a length of the guide member 14 between the two flanges 30, 32 of the first elongate guide member 14. For example, the axis Z can be generally parallel to one or more of the two flanges 30, 32 and/or spaced substantially equidistant between the two flanges 30, 32.

The second elongate guide member 18 can transition between a first (e.g., unloaded) position and a second (e.g., loaded) position when the drawer 80 is in the fully extended position (e.g., when the drawer 80 is fully extended from the cabinet 78 such that the release mechanism 140 engages with the stop 122). In the first position (FIG. 24), an engagement surface 127 (e.g., inner surface) of a flange of the second elongate guide member 18 is spaced vertically (e.g., within the frame of reference of FIG. 24) from the axis Z of the first elongate guide member 14 by a distance Du (e.g., an unloaded distance), as measured perpendicular to the axis Z, when the drawer 80 is in the fully extended position. As illustrated, a distance between the engagement surface 127 and an upper surface of the roller 120 (e.g., an internal gap) is designated by Do, as measured parallel to the distance Du and perpendicular to the axis Z.

Loading of the drawer 80 in the fully extended position (e.g., by applying a force F) can move the second elongate guide member 18 to the second position (FIG. 25). In the second position, the engagement surface 127 is spaced vertically from the axis Z by a distance Dl (e.g., a loaded distance). The difference between Du and Dl is designated by ΔD. In some cases, when the engagement surface 127 contacts the roller 120, ΔD will equal Do. Each of Du, Dl, and Do can be measured perpendicular to the axis Z and aligned with the rotational axis of the roller 120. The roller 120 can provide structural and/or rotational support to the second elongate guide member 18 when the second elongate member 18 is in the loaded configuration shown in FIG. 25. The roller 120 can remained spaced from the second elongate guide member 18 when the drawer 80 is unloaded and/or when ΔD is less than Do.

Overall, the drawer glide mechanisms 10 and 10' advantageously combines the low cost of an epoxy glide with the high performance of a ball bearing glide. This enables ease of manufacturing and assembly, labor and time savings, cost reduction, and results in drawers that operate and move smoothly within kitchen or bathroom cabinetry.

For example, and as described above, epoxy glides are low cost, and include a single roller (e.g. wheel) on both ends of the glide mechanism. The rollers are used to allow the drawer to slide in and out of a piece of cabinetry along the guide members. The epoxy guides do not utilize capturing of components to severely restrict or entirely prohibit relative movement of components. Rather, the guides of an epoxy glide are set loosely within one another such that one guide member can unintentionally move relative the other during the operation, often resulting in uneven and wobbly drawer movement. Epoxy glides include an inner guide member and an outer guide member. The inner guide member can sit at least in part within the outer guide member, such that the roller on each guide member contacts the other opposing guide member. However, in this arrangement it is possible for the inner guide member to fall off of or slip away from an outer guide member in at least one direction, causing the rollers to lose at least partial contact with the guide members, and for the drawer movement to become unstable and non-linear.

The ball bearing guides, on the other hand, are often bulky, expensive, and require two-piece sockets and/or additional fasteners (e.g. bolts) to support them within a storage compartment. These guides are often designed for use in industrial settings, such as for storage of computer components. They are also designed and used for high end cabinetry, where the walls of the cabinet are much thicker than common kitchen and bathroom cabinetry, and where the dimensional tolerances in designing and manufacturing the cabinetry are more precise.

In common kitchens and bathrooms, where the tolerances of the cabinetry are not as precise, and where there are often misshapen, slightly warped, and/or different sized cabinets, it would be advantageous to have drawer glides that utilize the more smooth, linear operation of a ball bearing guide, yet are still light-weight, low cost, and can function within a cabinet that does not have the thick paneling and precise tolerances found in the cabinetry described above. Thus, it would be advantageous to have drawer glides that have tight capture, as described above, such that the elongate guides 14, 18 do not fall of or slip away from one another as occurs with epoxy glides, and also advantageous to have drawer glides that can be installed in cabinets with relatively low dimensional tolerances and thin paneling.

The drawer glide mechanisms 10 and 10' described above can accomplish these goals by utilizing, for example, an inexpensive, single plastic socket piece, such as v-notch socket 12, with relatively thin metal guide members 14, 18, and a metal ball bearing component 16. The drawer glide mechanisms 10 and 10' described above is both light-weight and low cost, can be used interchangeably with common v-notch sockets typically used in kitchen bathrooms and cabinets, and affords the consistently smooth and well-structured movement that is desired.

Additionally, while the drawer glide mechanisms 10 and 10' can be made to have a smooth operation and have tight tolerances, the drawer glide 10 can also advantageously include one or more components to facilitate adjustment of the guide members 14, 18 and/or of an attached drawer. For example, and as described above, the drawer glide mechanisms 10 and 10' can include one or more floating and fixed members, slots, and/or embossing. These components can aid in the installation and proper adjustment of a drawer within a kitchen or bathroom cabinet. Additionally, or alternatively, the drawer glide mechanisms 10 and 10' can include a v-notch socket 12 that has opening(s) such as a first opening and second opening 22, 24 that facilitate relative movement of the first elongate guide member 12 with the drawer cabinet itself (e.g. to the back wall panel 82 of the drawer cabinet 78). Advantageously, these adjustments can be self-adjusting. Thus, no additional equipment, fasteners, and/or any type of further mechanical adjustment is required by an operator once the drawer has initially been installed.

While the above embodiments are described in the context of a kitchen or bathroom cabinet, the embodiments described above can be used in other environments as well, including but not limited to other areas of a home, in commercial settings such as offices, warehouses, etc. Additionally, while the embodiment of the drawer glide mechanism 10 described above and illustrated in FIGS. 1-18 includes a v-notch socket 12, a first elongate guide member 14, a ball bearing component 16, a second elongate guide member 18, two floating members 54, two fixed members 56, a slot 52, and an embossed portion 74, other combinations and numbers of components can also be used. For example, in some embodiments a drawer glide mechanism can include a v-notch socket 12, a first elongate guide member 14, a ball bearing component 16, a second elongate guide member 18, three floating members 54, three fixed members 56, and an embossed portion 74. In some embodiments a drawer glide mechanism can include a v-notch socket 12, a first elongate guide member 14, a ball bearing component 16, a second elongate guide member 18, two floating members 54, and two fixed members 56. In some embodiments a drawer glide mechanism can include a v-notch socket 12, a first elongate guide member 14, a ball bearing component 16, and a second elongate guide member 18. In some embodiments a drawer glide mechanism can include a v-notch socket 12, a first elongate guide member 14, a ball bearing component 16, a second elongate guide member 18, two floating members 54, two fixed members 56, and a slot 52. Various other combinations are also possible.

Furthermore, in some embodiments the drawer glide mechanism can comprise for example a common epoxy glide, without a ball bearing component, but can include one or more floating members 54, fixed members 56, slots 52, and/or embossed portions 74. Thus, the floating and fixed members 54, 56, as well as other features described above including but not limited to the slot 52 and embossed portion 74, can be used not only on a ball bearing glide like drawer glide mechanism 10 described above, but on any type of glide mechanism.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combinations or sub-combinations of the specific features and aspects of the embodiments can be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A drawer glide mechanism comprising:
    a first elongate guide member having:
        a first end;
        a second end;
        a first connector configured to connect to a back wall of a cabinet; and
        a second connector positioned between the first connector and the second end of the first elongate guide member and configured to connect to a second portion of the cabinet;
    a second elongate guide member coupled with the first elongate guide member, the second elongate guide member having a distal end and a proximal end;
    a ball bearing component nested between the first elongate guide member and the second elongate guide member; and
    a roller support coupled with the first elongate guide member adjacent the second end of the first elongate guide member,
    wherein the roller support is configured to limit deflection of the proximal end of the second elongate guide member in a downward direction when a downward force is applied to the proximal end of the second elongate member, wherein the roller support is configured such that the second elongate guide member contacts the roller support only when the proximal end is below the distal end.

2. The mechanism of claim 1, wherein the roller support is configured to rotate about an axis of rotation, and wherein a distance between the axis of rotation and the first end of the first elongate guide member is at least 75% of a length of the first elongate guide member.

3. The mechanism of claim 1, wherein the roller support is configured to rotate about an axis of rotation, wherein the first elongate guide member includes an upper flange and a lower flange, and wherein a first distance between the axis of rotation of the roller support and the lower flange is between about 55% and about 65% of a second distance between the upper flange and the lower flange.

4. The mechanism of claim 1, wherein the second elongate guide member has an upper flange and a lower flange, and wherein the roller support has a diameter that is less than 90% of a distance between the upper and lower flanges of the second elongate guide member.

5. The mechanism of claim 1, wherein the roller support is configured to rotate about an axis of rotation, and wherein a distance between the axis of rotation and the first end of the first elongate guide member is greater than about 85% of a length of the first elongate guide member.

6. The mechanism of claim 1, wherein the roller support is configured to rotate about an axis of rotation, and wherein a distance between the axis of rotation and the first end of the first elongate guide member is greater than about 90% of a length of the first elongate guide member.

7. The mechanism of claim 1, wherein the roller support is configured to rotate about an axis of rotation, wherein the first elongate guide member includes an upper flange and a lower flange, and wherein a first distance between the axis of rotation of the roller support and the lower flange is greater than 1/2 of a second distance between the upper flange and the lower flange.

8. The mechanism of claim 1, wherein the roller support is configured to rotate about an axis of rotation, wherein the first elongate guide member includes an upper flange and a lower flange, and wherein a first distance between the axis of rotation of the roller support and the lower flange is greater than 9/16 of a second distance between the upper flange and the lower flange.

9. The mechanism of claim 1, wherein the roller support is configured to rotate about an axis of rotation, wherein the first elongate guide member includes an upper flange and a lower flange, and wherein a first distance between the axis of rotation of the roller support and the lower flange is greater than 3/4 of a second distance between the upper flange and the lower flange.

10. The mechanism of claim 1, wherein the second elongate guide member has an upper flange and a lower flange, and wherein the roller support has a diameter that is less than 75% of a distance between the upper and lower flanges of the second elongate guide member.

11. The mechanism of claim 1, wherein the second elongate guide member has an upper flange and a lower flange, and wherein the roller support has a diameter that is less than 50% of a distance between the upper and lower flanges of the second elongate guide member.

12. The mechanism of claim 1, wherein the second elongate guide member has an upper flange and a lower flange, and wherein the roller support has a diameter that is approximately ⅔ of a distance between the upper and lower flanges of the second elongate guide member.

13. The mechanism of claim 1, wherein the roller support is coupled with the first elongate guide member via welding.

14. The mechanism of claim 1, wherein the roller support is coupled with the first elongate guide member via a rivet.

15. The mechanism of claim 1, wherein the roller support is coupled with the first elongate guide member via a fastener.

16. The mechanism of claim 1, wherein the roller support is configured to limit deflection of the proximal end of the second elongate guide member in the downward direction to ¼ of an inch below the distal end of the second elongate guide member when a downward force is applied to the proximal end of the second elongate member.

17. The mechanism of claim 1, wherein the roller support is configured to limit deflection of the proximal end of the second elongate guide member in the downward direction to ⅛ of an inch below the distal end of the second elongate guide member when a downward force is applied to the proximal end of the second elongate member.

18. The mechanism of claim 1, wherein the roller support is configured to limit deflection of the proximal end of the second elongate guide member in the downward direction to 1/16 of an inch below the distal end of the second elongate guide member when a downward force is applied to the proximal end of the second elongate member.

19. The mechanism of claim 1, wherein the roller support is configured to limit deflection of the proximal end of the second elongate guide member in the downward direction to 3/32 of an inch below the distal end of the second elongate guide member when a downward force is applied to the proximal end of the second elongate member.

* * * * *